(12) United States Patent
Treboux et al.

(10) Patent No.: US 11,893,810 B2
(45) Date of Patent: Feb. 6, 2024

(54) INDUSTRIALIZED SYSTEM FOR RICE GRAIN RECOGNITION AND METHOD THEREOF

(71) Applicant: Bühler AG, Uzwil (CH)

(72) Inventors: Jérôme Treboux, Sierre (CH); Calixte Mayoraz, Sierre (CH); Dominique Genoud, Sierre (CH); Matthias Graeber, Uzwil (CH); Sara Larsen, London (GB)

(73) Assignee: BÜHLER AG, Uzwil (CH)

( * ) Notice: Subject to any disclaimer, the term of this patent is extended or adjusted under 35 U.S.C. 154(b) by 206 days.

(21) Appl. No.: 17/440,202

(22) PCT Filed: Mar. 19, 2020

(86) PCT No.: PCT/EP2020/057646
§ 371 (c)(1),
(2) Date: Sep. 17, 2021

(87) PCT Pub. No.: WO2020/188042
PCT Pub. Date: Sep. 24, 2020

(65) Prior Publication Data
US 2022/0012519 A1      Jan. 13, 2022

(30) Foreign Application Priority Data
Mar. 19, 2019   (CH) .................... 00341/19

(51) Int. Cl.
*G06V 20/68* (2022.01)
*G06T 7/12* (2017.01)
(Continued)

(52) U.S. Cl.
CPC .......... *G06V 20/68* (2022.01); *G06F 18/2178* (2023.01); *G06F 18/285* (2023.01);
(Continued)

(58) Field of Classification Search
CPC .... G06V 20/68; G06V 10/462; G06V 10/764; G06V 10/82; G06F 18/2178; G06F 18/285; G06T 7/12
See application file for complete search history.

(56) References Cited

U.S. PATENT DOCUMENTS

| 2017/0372000 A1* | 12/2017 | Ethington | G06Q 10/20 |
| 2018/0000462 A1* | 1/2018 | Venkataramani | A61B 5/015 |
| 2020/0084966 A1* | 3/2020 | Corban | A01D 61/02 |

OTHER PUBLICATIONS

Vu et al., "Inspecting Rice Seed Species Purity on a Large Dataset Using Geometrical and Morphological Features", XP958423213, Dec. 6, 2018.
(Continued)

*Primary Examiner* — Casey L Kretzer
(74) *Attorney, Agent, or Firm* — XSENSUS LLP

(57) ABSTRACT

An industrialized system and method for rice grain recognition. An optical image is taken and transmitted to a digital platform, wherein the system segments the optical image and extracts and/or measures appropriate grain features from the image describing different aspects of the grain. The image is processed by the system which includes a selector selecting different machine learning structures, applying the different machine learning structures to the extracted features for rice grain recognition, and selecting the best of the applied machine learning structures by a random sampling process. The selected best of the applied machine learning structures is further optimized by varying an appropriate threshold by a threshold trigger based on a confusion matrix comprising. An active learning structure based on the confusion matrix to the user. The system is retrained based on the feedback parameters of the feedback loop.

17 Claims, 22 Drawing Sheets

(51) Int. Cl.
  *G06F 18/20*   (2023.01)
  *G06F 18/21*   (2023.01)
  *G06V 10/46*   (2022.01)
  *G06V 10/764*  (2022.01)
  *G06V 10/82*   (2022.01)

(52) U.S. Cl.
  CPC .............. *G06T 7/12* (2017.01); *G06V 10/462* (2022.01); *G06V 10/764* (2022.01); *G06V 10/82* (2022.01)

(56) References Cited

OTHER PUBLICATIONS

International Search Report and Written Opinion dated Jun. 5, 2020, received for PCT Application PCT/EP2020/057646, Filed on Mar. 19, 2020, 16 pages.

Aki et al., "Classification of Rice Grains Using Image Processing And Machine Learning Techniques", International Scientific Conference, UNITECH 2015, Nov. 20-21, 2015, pp. 352-354.

Arvai, "Fine Tuning a Classifier in Scikit-Learn—Towards Data Science", Towards Data Science, Jan. 24, 2018, pp. 1-15.

Ju et al., "The Relative Performance of Ensemble Methods with Deep Convolutional Neural Networks for Image Classification", Arxiv.Org, Cornell University Library, arXiv:1704.01664v1, Apr. 5, 2017, pp. 1-20.

\* cited by examiner

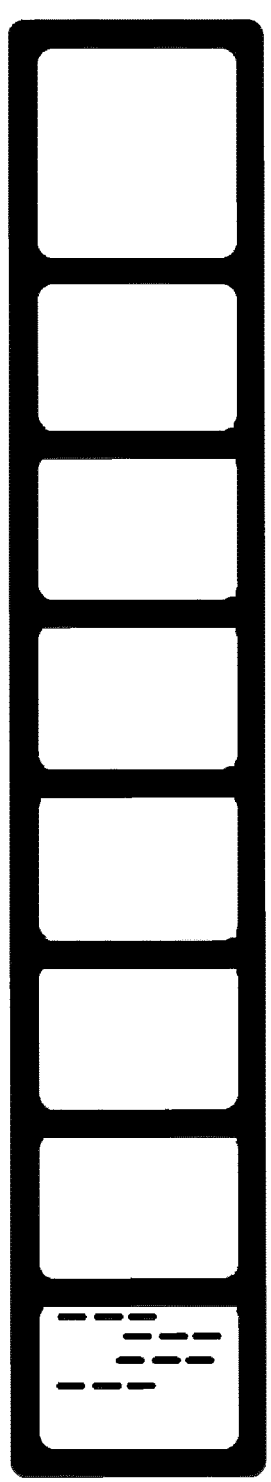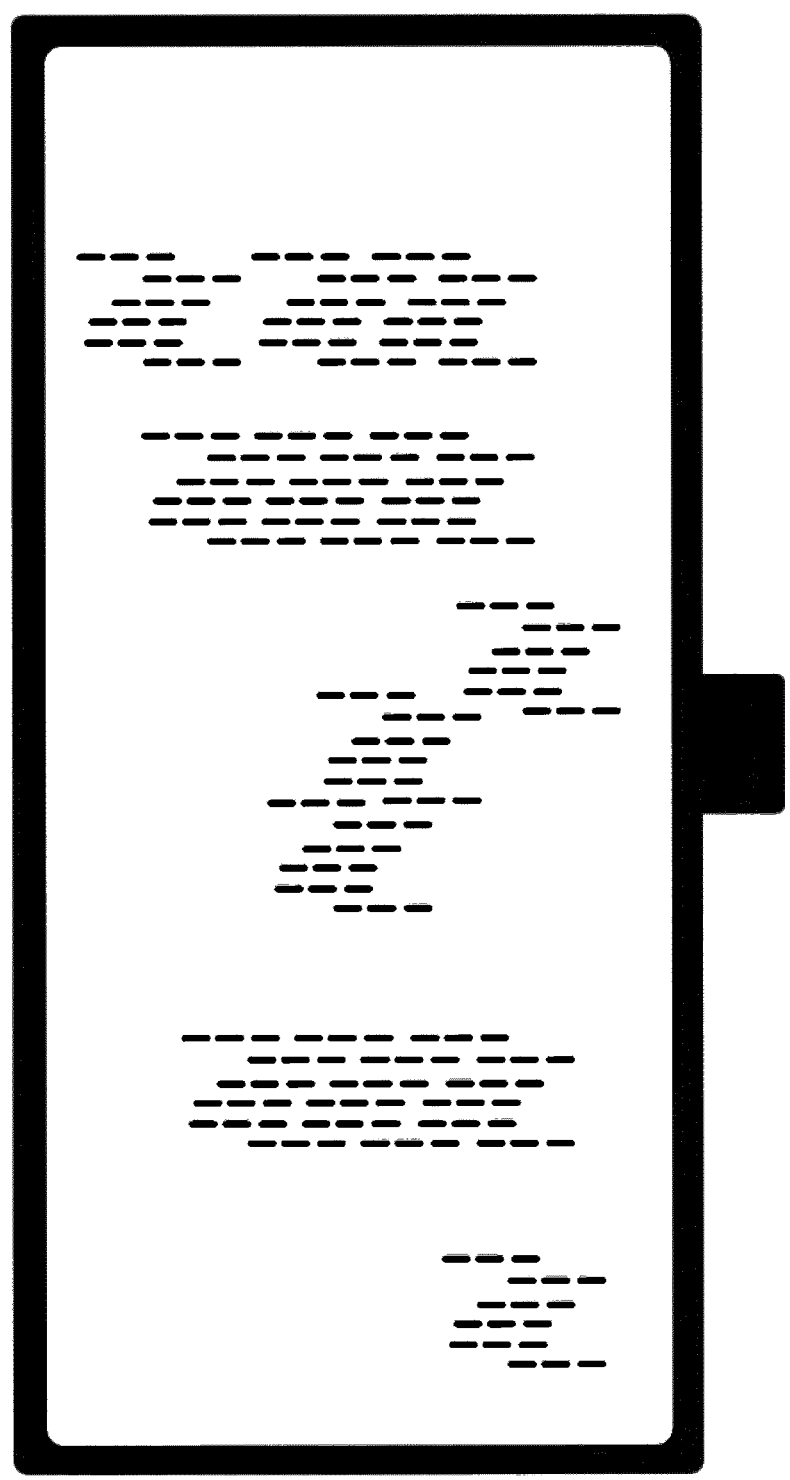
Fig. 3

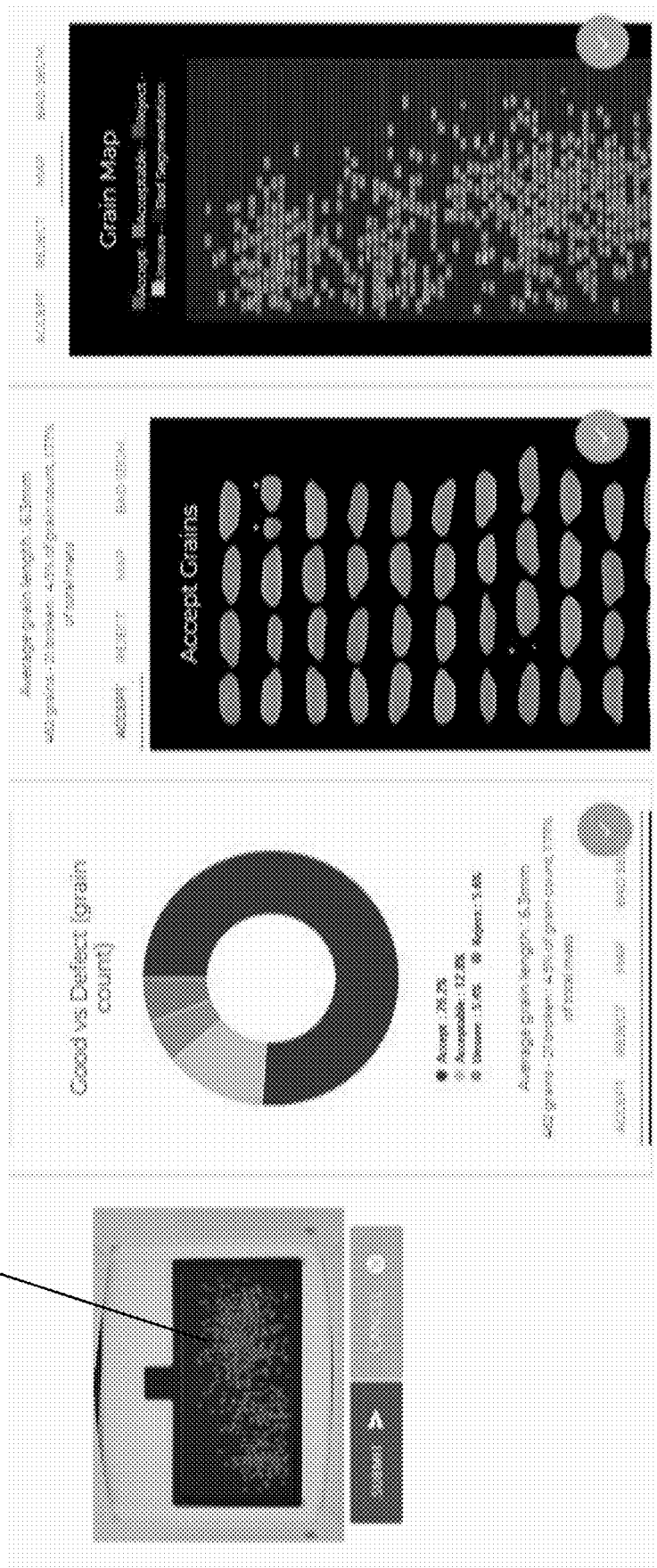

INDUSTRIALIZED SYSTEM FOR RICE GRAIN RECOGNITION AND METHOD THEREOF

CROSS-REFERENCE TO RELATED APPLICATIONS

The present application is the United States national stage of PCT International Patent Application No. PCT/EP2020/057646, filed Mar. 19, 2020, which claims the benefit of CH 00341/19, filed Mar. 19, 2019, the entire contents of each are incorporated herein by reference

FIELD OF THE INVENTION

The present invention relates to the field of industrialized systems for rice and other grains recognition and classification. In particular, to optical classification and optimized sorting device for sorting deteriorated rice or other seeds.

BACKGROUND OF THE INVENTION

Optical grains recognition and classification is an important technical field in the industrial production rice posing many technical challenges. On the other side, the importance of rice as staple food cannot be overestimate. Rice is the most important food crop of the developing world and the staple food of more than half of the world's population, thus, rice is the most important human food crop in the world, directly feeding more people than any other crop. In 2012, nearly half of world's population—more than 3 billion people—relied on rice every day. It is also the staple food across Asia where around half of the world's poorest people live and is becoming increasingly important in Africa and Latin America. Rice has also fed more people over a longer time than has any other crop. It is spectacularly diverse, both in the way it is grown and how it is used by humans. Rice is unique because it can grow in wet environments that other crops cannot survive in. Such wet environments are abundant across Asia. The domestication of rice ranks as one of the most important developments in history and now thousands of rice varieties are cultivated on every continent except Antarctica.

Rice is produced in a wide range of locations and under a variety of climatic conditions, from the wettest areas in the world to the driest deserts. It is produced along Myanmar's Arakan Coast, where the growing season records an average of more than 5,100 mm of rainfall, and at Al Hasa Oasis in Saudi Arabia, where annual rainfall is less than 100 mm. Temperatures, too, vary greatly. In the Upper Sind in Pakistan, the rice season averages 33° C.; in Otaru, Japan, the mean temperature for the growing season is 17° C. The crop is produced at sea level on coastal plains and in delta regions throughout Asia, and to a height of 2,600 m on the slopes of Nepal's mountains. Rice is also grown under an extremely broad range of solar radiation, ranging from 25% of potential during the main rice season in portions of Myanmar, Thailand, and India's Assam State to approximately 95% of potential in southern Egypt and Sudan. Rice occupies an extraordinarily high portion of the total planted area in South, Southeast, and East Asia. This area is subject to an alternating wet and dry seasonal cycle and also contains many of the world's major rivers, each with its own vast delta. Here, enormous areas of flat, low-lying agricultural land are flooded annually during and immediately following the rainy season. Only two major food crops, rice and taro, adapt readily to production under these conditions of saturated soil and high temperatures.

Two rice species are important cereals for human nutrition: *Oryza sativa*, grown worldwide, and *O. glaberrima*, grown in parts of West Africa. These two cultigens species known only by cultivated plants belong to a genus that includes about 25 other species, although the taxonomy is still a matter of research and debate. *Oryza* is thought to have originated about 14 million years ago in Malesia. Since then, it has evolved, diversified, and dispersed, and wild *Oryza* species are now distributed throughout the tropics. Their genomes can be classified into 11 groups labeled AA to LL, and most of the species can be grouped into four complexes of closely related species in two major sections of the genus. Just two species, both diploids, have no close relatives and are placed in their own sections of the genus: *O. australiensis* and *O. brachyantha*.

Throughout the growing, rice goes through a series of processes before finally reaching the end consumer. Its production can generally be divided into the following stages: Seed selection, land preparation, crop establishment, water management, nutrient management, crop health, Harvesting, and Postharvest. Seed is a living product that must be grown, harvested, and processed correctly in order to realize the yield potential of any rice variety. Good quality seed can increase yields by 5-20%. Using good seed leads to lower seeding rates, higher crop emergence, reduced replanting, more uniform plant stands, and more vigorous early crop growth. Vigorous growth in early stages reduces weed problems and increases crop resistance to insect pests and diseases. All of these factors contribute to higher yields and more productive rice farms. Good seed is pure (of the chosen variety), full and uniform in size, viable (more than 80% germination with good seedling vigor), and free of weed seeds, seed-borne diseases, pathogens, insects, or other matter. Choosing seed of a suitable variety of rice that suits the environment it will be grown in and ensuring the seed chosen of that variety is of the highest possible quality is the essential first step in rice production. For land preparation, before rice can be planted, the soil should be in the best physical condition for crop growth and the soil surface is level. Land preparation involves plowing and harrowing to 'till' or dig-up, mix and level the soil. Tillage allows the seeds to be planted at the right depth, and also helps with weed control. Farmers can till the land themselves using hoes and other equipment or they can be assisted by draft animals, such as buffalo, or tractors and other machinery. Next, the land is leveled to reduce the amount of water wasted by uneven pockets of too-deep water or exposed soil. Effective land leveling allows the seedlings to become established more easily, reduces the amount of effort required to manage the crop, and increases both grain quality and yields. For the crop establishment, the two main practices of establishing rice plants are transplanting and direct seeding. Transplanting is the most popular plant establishment technique across Asia. Pre-germinated seedlings are transferred from a seedbed to the wet field. It requires less seed and is an effective method to control weeds but requires more labor. Seedlings may be transplanted by either machine or hand. Direct seeding involves broadcasting dry seed or pre-germinated seeds and seedlings by hand or planting them by machine. In rainfed and deep-water ecosystems, dry seed is manually broadcast onto the soil surface and then incorporated either by ploughing or by harrowing while the soil is still dry. In irrigated areas, seed is normally pre-germinated prior to broadcasting. Concerning water use and management, cultivated rice is extremely sensitive to water shortages. To ensure sufficient water, most rice farmers aim to maintain flooded conditions in their field. This is especially true for lowland rice. Good water management in lowland rice focuses on practices that conserve water while ensuring sufficient water for the crop. In rainfed environments when optimal amounts of water may not be available for rice production, a suite of options are available to help farmers cope with different degrees and forms of water scarcity. It includes sound land preparation and pre-planting activities followed by techniques such as saturated soil culture, alternate wetting and drying, raised beds, mulching, and use of aerobic rice that can cope with dryer conditions. Concerning nutrient management, at each growth stage, the rice plant has specific nutrient needs. This makes nutrient management a critical aspect of rice farming. The unique properties of flooded soils make rice different from any other crop. Because of prolonged flooding in rice fields, farmers are able to conserve soil organic matter and also receive free input of nitrogen from biological sources, which means they need little or no nitrogen fertilizer to retain yields. However, farmers can tailor nutrient management to the specific conditions of their field to increase yields. Concerning crop health, the rice plant has a wide array of 'enemies' in the field. These include rodents, harmful insects, viruses, diseases, and weeds. Farmers manage weeds through water management and land preparation, by hand weeding, and in some cases herbicide application. Understanding the interactions among pests, natural enemies, host plants, other organisms, and the environment allows farmers to determine what if any pest management may be necessary. Avoiding conditions that allow pests to adapt and thrive in a particular ecosystem helps to identify weak links in the pests' life cycle and therefore what factors can be manipulated to manage them. Retaining natural ecosystems such that predators and natural enemies of pests and diseases are kept in abundance can also help keep pest numbers down.

Concerning harvest, harvesting is the process of collecting the mature rice crop from the field. Depending on the variety, a rice crop usually reaches maturity at around 105-150 days after crop establishment. Harvesting activities include cutting, stacking, handling, threshing, cleaning, and hauling. Good harvesting methods help maximize grain yield and minimize grain damage and deterioration. Harvesting can be done manually or mechanically: (i) Manual harvesting is common across Asia It involves cutting the rice crop with simple hand tools like sickles and knives. Manual harvesting is very effective when a crop has lodged or fallen over, however it is labor intensive. Manual harvesting requires 40 to 80 hours per hectare and it takes additional labor to manually collect and haul the harvested crop; (ii) Mechanical harvesting using reapers or combine harvesters is the other option, but not so common due to the availability and cost of machinery. Following cutting the rice must be threshed to separate the grain from the stalk and cleaned. These processes can also be done by hand or machine.

After harvest, the rice grain undergoes a number of processes depending on how it will be used. These include, drying, storing, milling, processing, and packing—all before they are delivered to markets for sale. Drying is the process that reduces grain moisture content to a safe level for storage. It is the most critical operation after harvesting a rice crop. Delays in drying, incomplete drying or ineffective drying will reduce grain quality and result in losses. Storing grain is done to reduce grain loss to weather, moisture, rodents, birds, insects and micro-organisms. Usually rice should be stored in paddy form rather than milled rice as the husk provides some protection against insects. In the International Rice Genebank where rice seed from more than 118,000 different types of rice is conserved, rice seed is kept in vacuum packed, freezers at $-18°$ C., where they can remain viable for 100 years. Rice storage facilities take many forms depending on the quantity of grain to be stored, the purpose of storage, and the location of the store. A good storage system should include: (i) protection from insects, rodents and birds by allowing proper storage hygiene, (ii) ease of loading and unloading, (iii) efficient use of space, (iv) ease of maintenance and management, (v) prevention of moisture re-entering the grain after drying, (vi) specific solutions to meet the challenges of storing rice in the humid tropics. Milling is a crucial step in post-production of rice. The basic objective of a rice milling system is to remove the husk, and produce an edible, rice grain that is sufficiently milled and free of impurities. If only the husk is removed then 'brown' rice is the product. If the rice is further milled or polished then the bran layer is removed to reveal 'white' rice. Depending on the requirements of the customer, the rice should have a minimum of broken grains. A rice milling system can be a simple one- or two-step process, or a multi-stage process. Depending on whether the paddy is milled in the village for local consumption or for the marketing rice milling systems can be classified into the categories village rice mills and commercial mills. Once milled, rice is packed and transported to point of sale, which may be local or international.

Global rice production more than tripled between 1961 and 2010, with a compound growth rate of 2.24% per year (2.21% in rice-producing Asia). This increase was slightly greater than that for wheat (2.02% per year), but substantially less than that for maize, which grew at 2.71% per year. Most of the increase in rice production was due to higher yields, which increased at an annual average rate of 1.74%, compared with an annual average growth rate of 0.49% for area harvested. In absolute terms, paddy yields increased at an annual average rate of 51.1 kg/ha per year, although this rate of increase has declined in both percentage and absolute terms. Rice is grown by more people than any other crop in the world. There are over 144 million rice farms worldwide on a harvested area of about 158 million hectares. It is cultivated in wide range of climates and terrains, by hand or using massive machinery, by small families or large agricultural corporations. The contrasts in the geographic, economic, and social conditions under which rice is produced are vast.

For rice to be sellable on the markets, it needs to be correctly sorted to contain as little unwanted material as possible. These unwanted materials can range from quality-impacting factors such as discolored or immature grains, to unacceptable foreign materials that impact food safety such as sand, rocks, glass, or pieces of machinery. For this purpose, optical sorting machines have been developed which can typically sort up to 20 metric tons of rice per hour. These machines pass rice through a chute where, as it falls, is analyzed using high-resolution customized cameras and decision circuits that can detect unwanted material in milliseconds. Once a defective grain or foreign material is detected, a small jet of air shoots the defect object out of its trajectory. As a result, only good grains continue to flow in the accept output bin.

Of course, this process is not perfect; quality control must regularly be conducted to ensure that an acceptable percentage of defect rice is filtered out to meet industry standards. Furthermore, broken grains can be considered second choice and can potentially be sold at different rates than whole grains. To estimate the contents of the output from optical sorters (or from any other processing stage) correctly, experts need to take the quality, size and broken state of each grain into account. The sorting, classifying and counting processes are still frequently done manually by experts who, based on their experience and training, can recognize even subtle grain defects. This manual quality analysis is time-consuming, requires expert knowledge and is highly subjective. Indeed, different experts can have different opinions on the quality of rice grains in terms of color and geometry defects. Moreover, an individual expert's opinion consistency will be influenced by various external factors such as lighting conditions, current physical and psychological well-being or available time for the quality control.

Out of frustration of the long and tedious work, quality control experts expressed the need to evaluate a sample quickly using a smartphone camera. This was the core motivator to start the project developing the present invention. In the first version of this project, which is currently in production, the user is given a light-tent, inside of which s/he places the sample of rice to be analyzed on a tray. The tray also contains reference samples of good grains, as well as different defect classes that are to be detected. The user then places a smartphone on top of the light-tent and takes a picture of the sample. The resulting image is sent to a server for processing and calculation of the results. Currently, the classification of good grains and defect grains is done using color analysis. Broken analysis is done by simply setting a threshold length to separate whole and broken grains. This approach works well for detecting color variations in the grains' overall color, for example on heat-damaged grains, which appear yellower than good grains. However, challenges remain with the correct classification of rice grains with small off-color spots and very short non-broken rice grains.

The document Hai Vu et al. "Inspecting rice seed species purity on a large dataset using geometrical and morphological features", Information and Communication Technology, December 2018 discloses a method for examining the purity of rice seed species. The method relies on a distinct feature extraction using both morphological and geometrical features extracted from high resolution RGB images. The collected seeds are normalized by their biological structure by means of appropriate pre-processing techniques, to allow an enough precise measurement of the geometrical features at a local part of a seed. The method uses larger number of species, so that the dependence of a classification performance on similarities of species, or types of the extracted features can be analyzed, which would otherwise not be possible by this method using smaller numbers of species. For the recognition method, a model of positive (correct species) and negative (wrong species) is trained using supervised classification techniques. In particular, three recognition methods are used in combination, namely Decision Tree (DT), Random Forest (RF), and Adaboost, which conjuncts the used decision trees as the weak learners to improve performance. The out-put of the weak classifier is combined into a weighted sum that represents the final output of the boosted classifier. The method does not want to differentiate the individual learners based on their strength, since the individual learners can be weak. But as long as the performance of each one is slightly better than random guessing, the final model is assumed in the disclosed method to converge to a stronger learner. To train the different recognition methods, morphological features and geometrical features are used separately and in a second step in combinations to achieve the highest performances.

The document Ozab Aki et al. "Classification of Rice Grains Using Image Processing And Machine Learning Techniques", www.reasearchgate.net, November 2015 discloses a method for classification of rice grains using image processing and machine learning techniques. There are 4 grain types used for classification, where broken grains are considered as a type too. Rice grain images are taken by a webcam. Six attribute are extracted for each grain image, where the grain attributes are related to its shape geometry. Attributes of known types of rice grains are used for training and compare different machine learning algorithms.

The document Kevin Arvai "Fine tuning a classifier in scikit-learn—Towards Data Science", towardsdatascience.com, January 2018 discloses a method for optimizing a classifier for sensitivity, i.e. minimizing false negatives. Using recognition methods, accuracy is typically but one of four relevant metrics, where the other three metrics are precision, recall and F1 score. Each metric measures something different about the system's performance. For this reason, it is also often desirable to optimize, and therefore prioritize, one metric over the other. Which metric to optimize depends on the context and objectives of the system. Precision is the ratio of system generated results that correctly predicted positive observations (True Positives) to the system's total predicted positive observations, i.e. correctly predicted positives (True Positives) and incorrectly predicted positives (False Positives). Recall is the ratio of system generated results that correctly predicted positive observations (True Positives) to all actually observed in the class (Actual Positives), i.e. the True Positives together with the False Negatives. Accuracy is the ratio of the correctly predicted classifications (both True Positives and True Negatives) to the total used dataset. Finally, the F1 Score is the weighted average (or harmonic mean) of Precision and Recall. Therefore, this score takes both False Positives and False Negatives into account to strike a balance between precision and Recall. Accuracy % can be disproportionately skewed by a large number of Actual Negatives. This is true for example true where there is high asymmetry in the data, hence a very high accuracy score of 99% (because accuracy assesses competence at identifying both Actual Positives and Actual Negatives) despite a low precision score, which assesses competence at identifying Actual Positives. The consider the most relevant measure strongly depends on the context. The Arvai method is focused on "precision" and "recall" as their optimal performance metric, because this method is used for identifying malignant cancer, where there exist a large number of people who don't have cancer, hence a very high accuracy score of 99% due to a high asymmetry in the data. The Arvai method discloses to use a two step "scikit-learn" approach to tune the used classifier for recall: (A) In a first step, the hyper-parameters of the used estimator are tuned y searching for the best hyperparameters and keeping the classifier with the highest recall score. In the scikit-learn approach, the hyper-parameters denote parameters that are not directly learnt within estimators. In the proposed method, search candidates are sampled for given values by an exhaustive grid search exhaustively considering all possible parameter combinations. It is to be noted, that there are also other strategies under the scikit-approach to tune the hyper-parameters, as e.g. randomized parameter optimization using a randomized search over parameters, where each setting is sampled from a distribution over possible parameter values; (B) The second step adjusts the decision threshold of the classifier using the precision-recall curve and the receiver operating characteristic curve (roc curve). The roc-curve gives the diagnostic ability of a binary classifier system as its discrimination threshold is varied, i.e. the sensitivity-specificity threshold in the classifier. The basic idea of the disclosed Arvai method to fine tune classifiers in scikit-learn is its use of the raw probability that a sample is predicted to be in a class. This is an important distinction from the absolute class predictions used by other methods.

Finally, the document Cheng Ju et al. "The Relative Performance of Ensemble Methods with Deep Convolutional Neural Networks for Image Classification", Cornell University Library, April 2017 discloses the use of ensembles of artificial neural networks applied to different machine learning tasks, including image recognition, semantic segmentation, and machine translation. The method involves multiple ensemble methods, including unweighted averaging, majority voting, the Bayes Optimal Classifier, and the (discrete) Super Learner, for image recognition tasks, with deep neural networks as candidate algorithms. The proposed algorithms either use the same network structure with different model check-points within a single training process, or networks with same structure but trained multiple times stochastically, or networks with different structure. The method discloses to use the Super Learner approach for best results, due to the over-confidence phenomenon of the neural networks and its impact on the different ensemble methods.

SUMMARY OF THE INVENTION

It is an object of the present invention to provide an industrialized system and method for rice grain recognition which is able to cope with the various impacts of the numerous origins of grain defects and defects variances, as described above. In particular, the industrialized system and method for rice grain recognition should overcome the drawbacks inhering the state of the art systems. More particularly, the inventive system should not have the drawbacks of the prior art systems, based solely on the known classification processes of good grains and defect grains using color analysis. Even more particularly, the system and method should be able for correct classification of rice grains with small off-color spots and very short non-broken rice grains, working on a higher efficiency and accuracy as known prior art systems.

According to the present invention, these objects are achieved, particularly, by the features of the independent claims. In addition, further advantageous embodiments can be derived from the dependent claims and related descriptions.

According to the present invention, the above-mentioned objects related to an industrialized system for rice grain recognition, the system comprising an optical capturing device for capturing an optical image, the optical capturing device comprising a data interface for transmitting the optical image to a digital platform over a data transmission network, wherein the optical image is analyzed by the digital platform and appropriate response is provided to the optical capturing device and/or a user device, in that the digital platform comprises a segmentation module segmenting the captured optical image for grains by identifying optical image segments capturing grains or grain parts, in that the digital platform comprises a feature extractor extracting measurable grain features from the identified grains or grain parts in the optical image, the features describing different parametrized aspects of the grains by a feature extraction process at least comprising shape parameter values and/or color parameter values and/or spatial parameters and/or geometric parameters, in that the digital platform comprises a classifier with a selector for sequential selecting of a plurality of machine learning structures, the selector applying the different machine learning structures to the extracted grain features for rice grain recognition, and selecting the best of the applied machine learning structures, in that the selected best of the applied machine learning structures is further optimized by varying an appropriate threshold by means of a threshold trigger, wherein the variation of the discrimination threshold varies the diagnostic ability of the binary classifier system varies related to the variation of the discrimination threshold.

BRIEF DESCRIPTION OF THE DRAWINGS

The present invention will be explained in more detail by way of example in reference to the drawings in which:

FIG. 3 shows a diagram illustrating schematically the trays 14, in particular a training tray 141 and a sample tray 142 allowing to capture rice grains 4 to be applied to the light tent 13 for the optical image 123 capturing.

FIG. 8$a$ additionally shows the captured optical image 123 before sending it via the data transmission network 2 for grain recognition to the digital platform 11.

FIG. 11 shows the pre-processing more detailed.

FIGS. 12 and 13 show the modification of variable threshold value by triggering desired threshold probability for a grain to be classified good (e.g. with maximization at 1% FP), more detailed.

FIG. 14 shows a diagram illustrating schematically an exemplary summary of experimental results of an embodiment of the inventions, wherein (a) the train set is retrained after each experiment; (b) a threshold tuning is applied after each retraining; and (c) the value of each point are: (i) Experiment with the previous modelling structure and threshold; (ii) Accuracy (in %) at the Equal Error Rate; (iii) Defect grains classified as good with a 1% threshold (False Positive in %); and (iv) Error importance based on the size of the experiment=False Positive (in %)*# of wrong classified grains.

FIG. 15 shows a diagram illustrating schematically exemplary effects of retraining the learning modelling structures. The extremely positive trend shows the benefice of retraining the classification models with corrected datasets by the inventive active learning structure.

FIG. 16 illustrates the peck detection. After retraining: 95% of accuracy at equal error rate (see ROC Curve)

Figure 19:
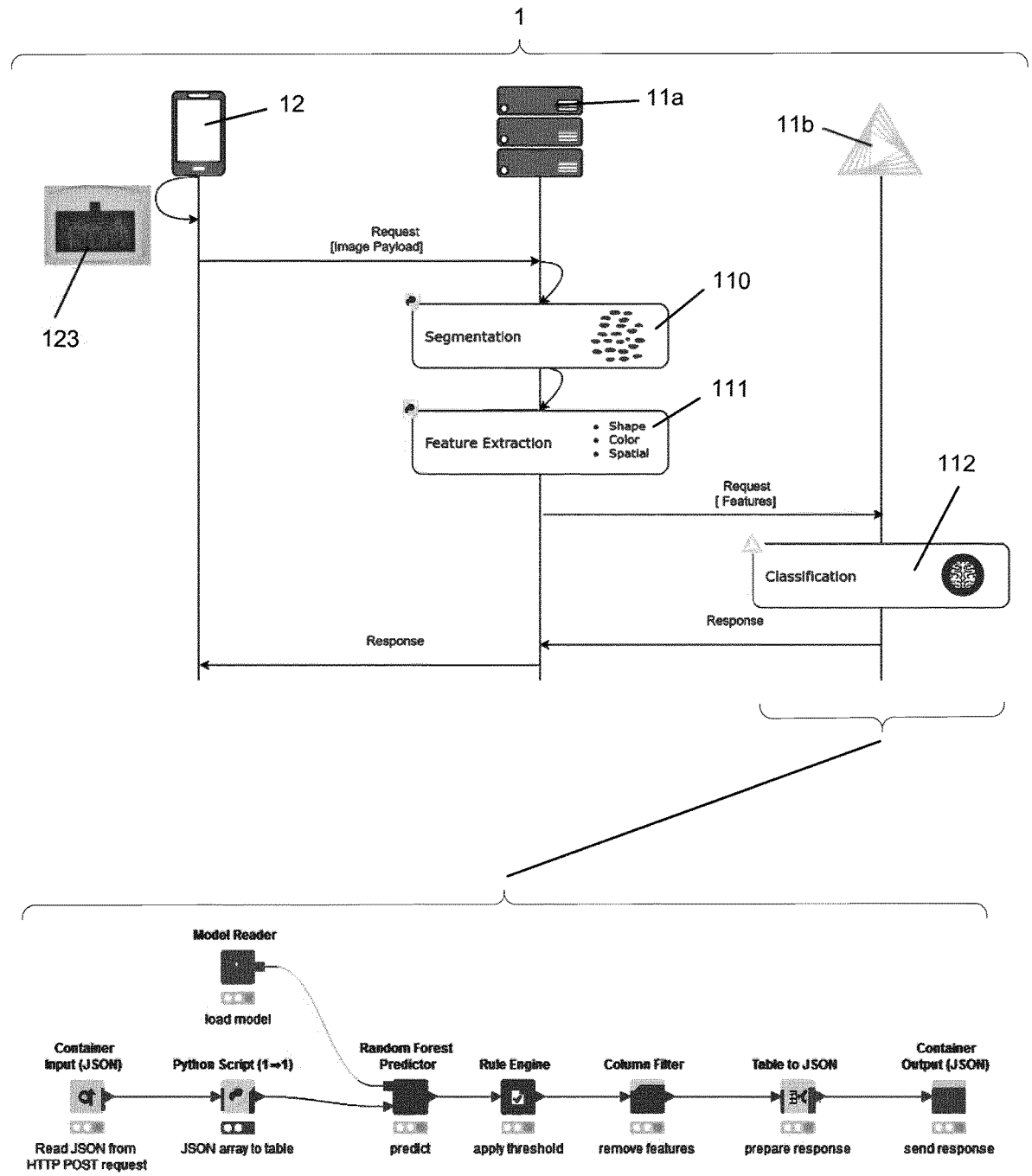

In the embodiment variant of FIG. 19, the digital platform 11 comprises a processing split structure with a cloud computing platform 11$a$ providing the rice grain recognition as software as a service (SaaS) and a machine learning/data mining system 11$b$ providing the machine learning and data mining processing through a modular data pipelining structure. In particular, further performance improvements can e.g. be achieved by using KNIME (Konstanz Information Miner) for the machine learning/data mining system 11$b$, as a data analytics, reporting and integration structure. The KNIME structure allows to integrate various components for machine learning and data mining through its modular data pipelining concept. A graphical user interface and use of JDBC allows assembly of nodes blending different data sources, including preprocessing (ETL: Extraction, Transformation, Loading), for modeling, data analysis and visualization without, or with only minimal, programming.

Figure 20:
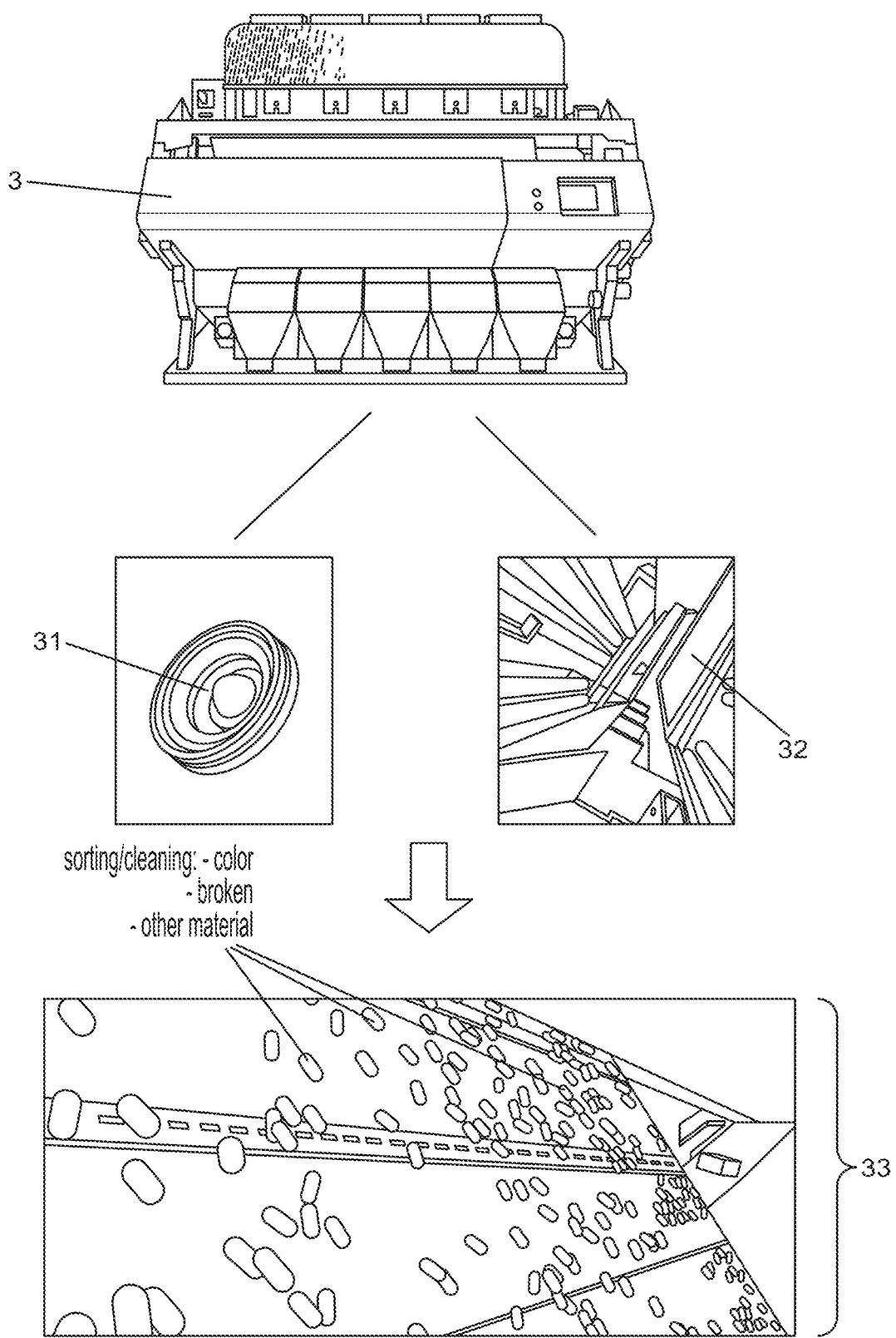

FIG. 20 show a diagram illustrating schematically an exemplary inventive project context of industrialization of rice grain recognition. The Sortex A is able to sort up to 20 tons/hour and is used in the main food supply half of the world. Such Sortex typically operate on basis of a conventional image processing comprising (i) color discrimination; (ii) depending on the size of the grain; and (iii) involving a lot of manual setup. Industrialization of rice grain recognition must be able to capture 120,000 rice varieties.

Figure 21:
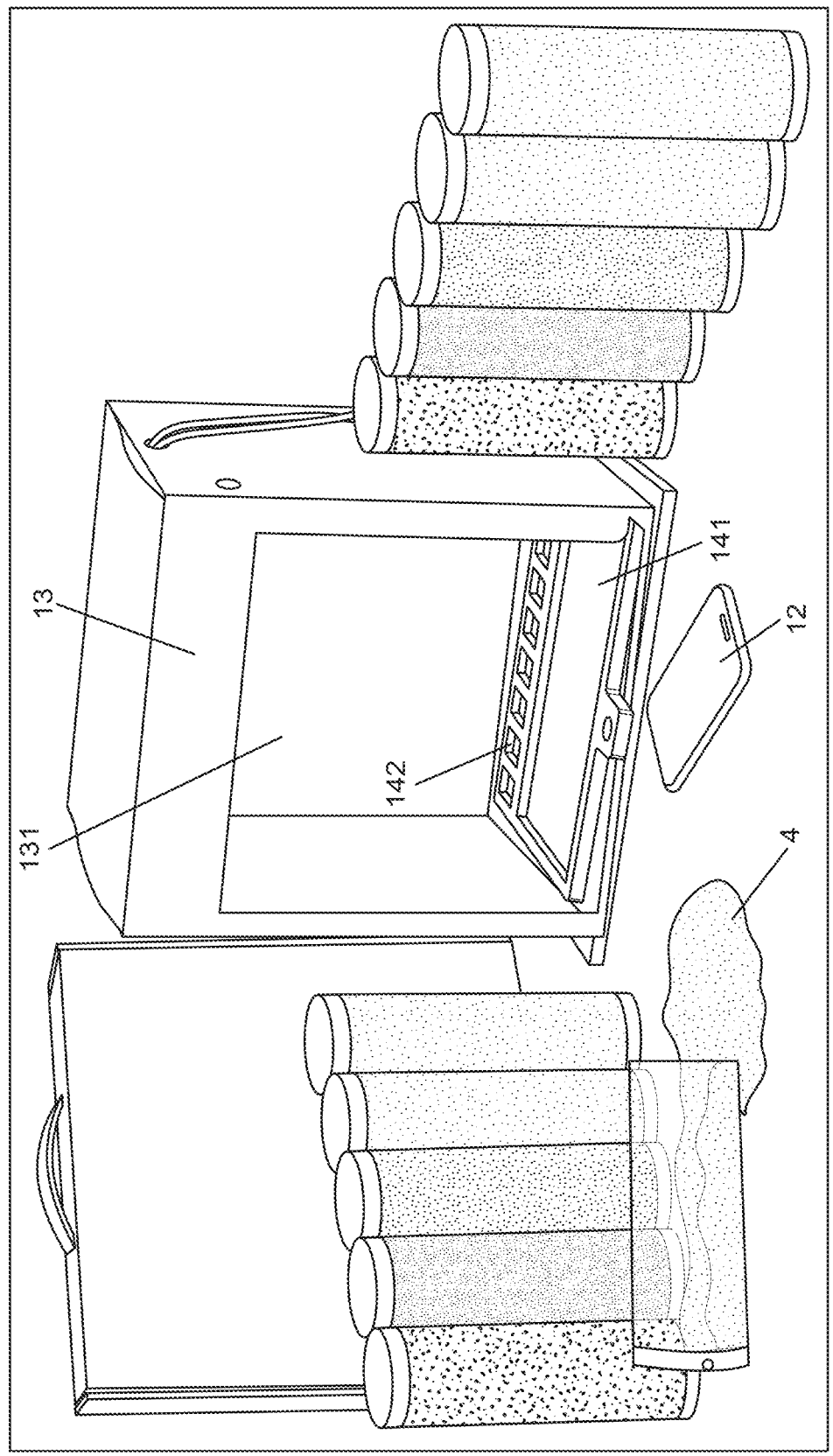
Figure 22:
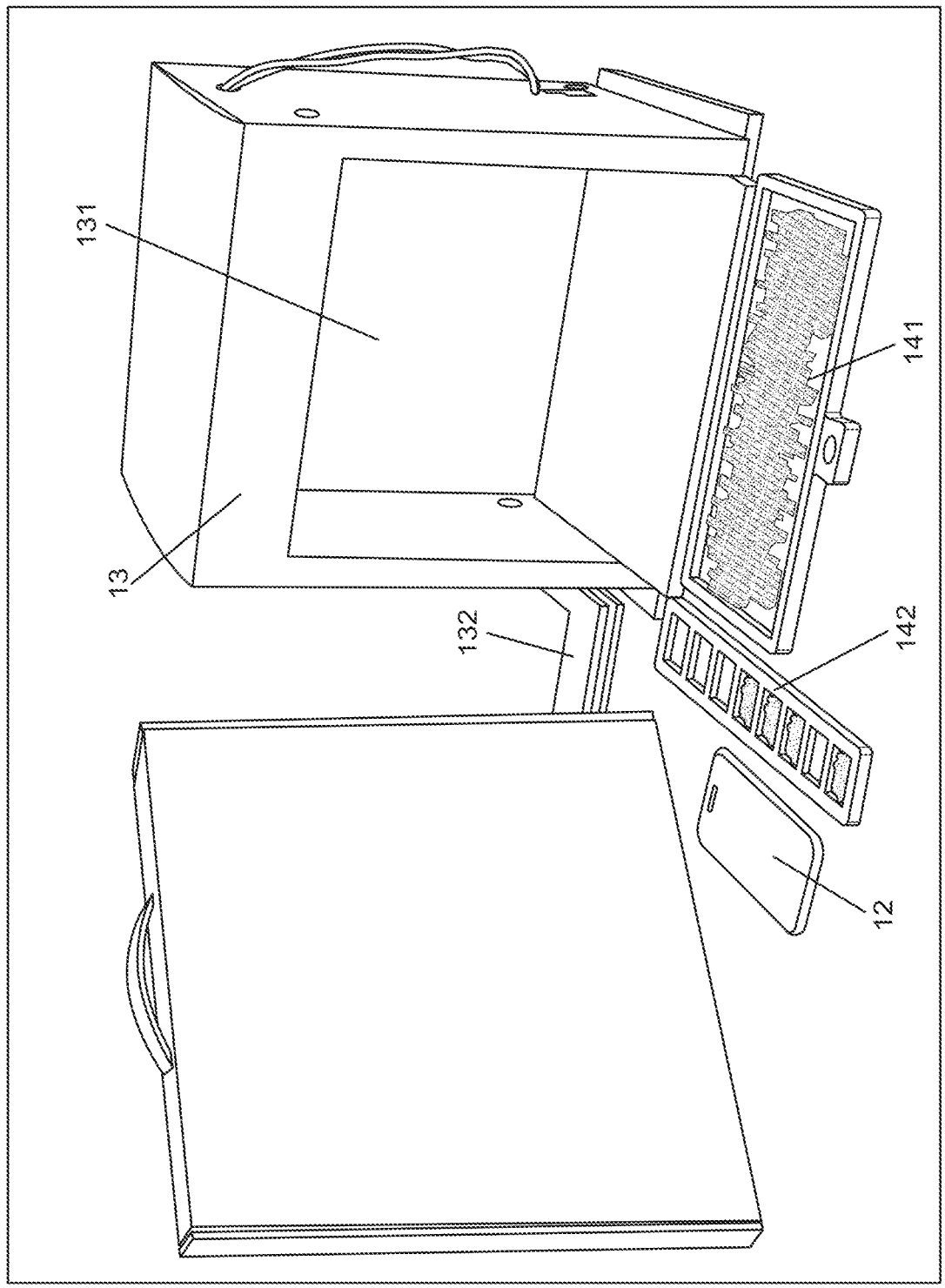

FIGS. 21 and 22 show a diagram illustrating schematically an exemplary light tent or light box 13 comprising a uniform light source 131 for the inner of the light tent 13 and a power supply 132. The light tent 13 has a hole 134 allowing to apply an optical sensor/camera 121/122, e.g. of a smart phone or another optical image capturing device 12.

DETAILED DESCRIPTION OF THE INVENTION

Figure 1:
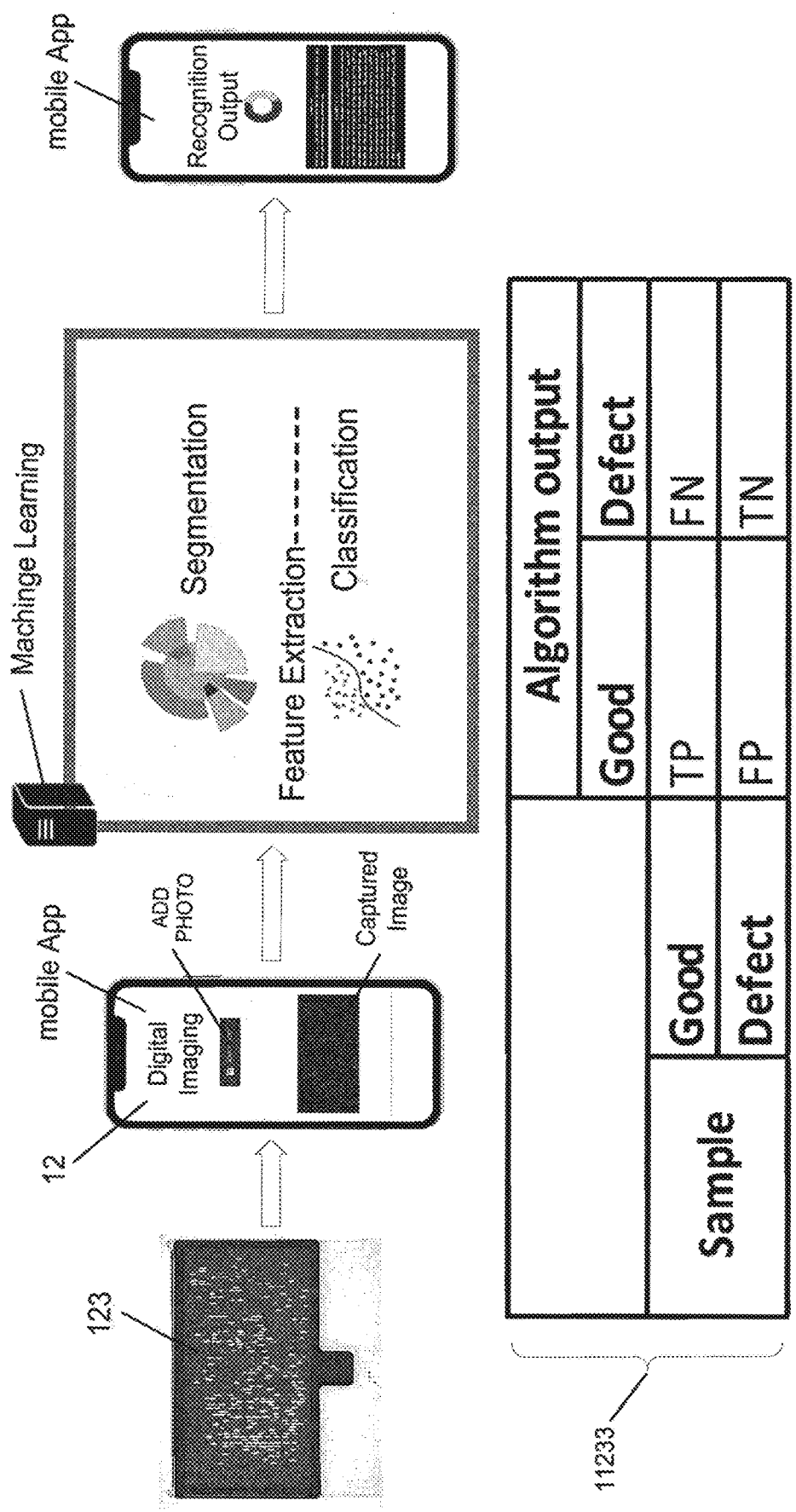
FIG. 1 shows a block diagram illustrating schematically an exemplary industrialized system 1 for rice grain recognition and classification, comprising segmentation 110, feature extraction 111 and classification 112 comprising selection of the preferred machine-learning structure 11211, . . . , 1121$i$, and further minimization of the false-positive rate (FP).
Figure 2:
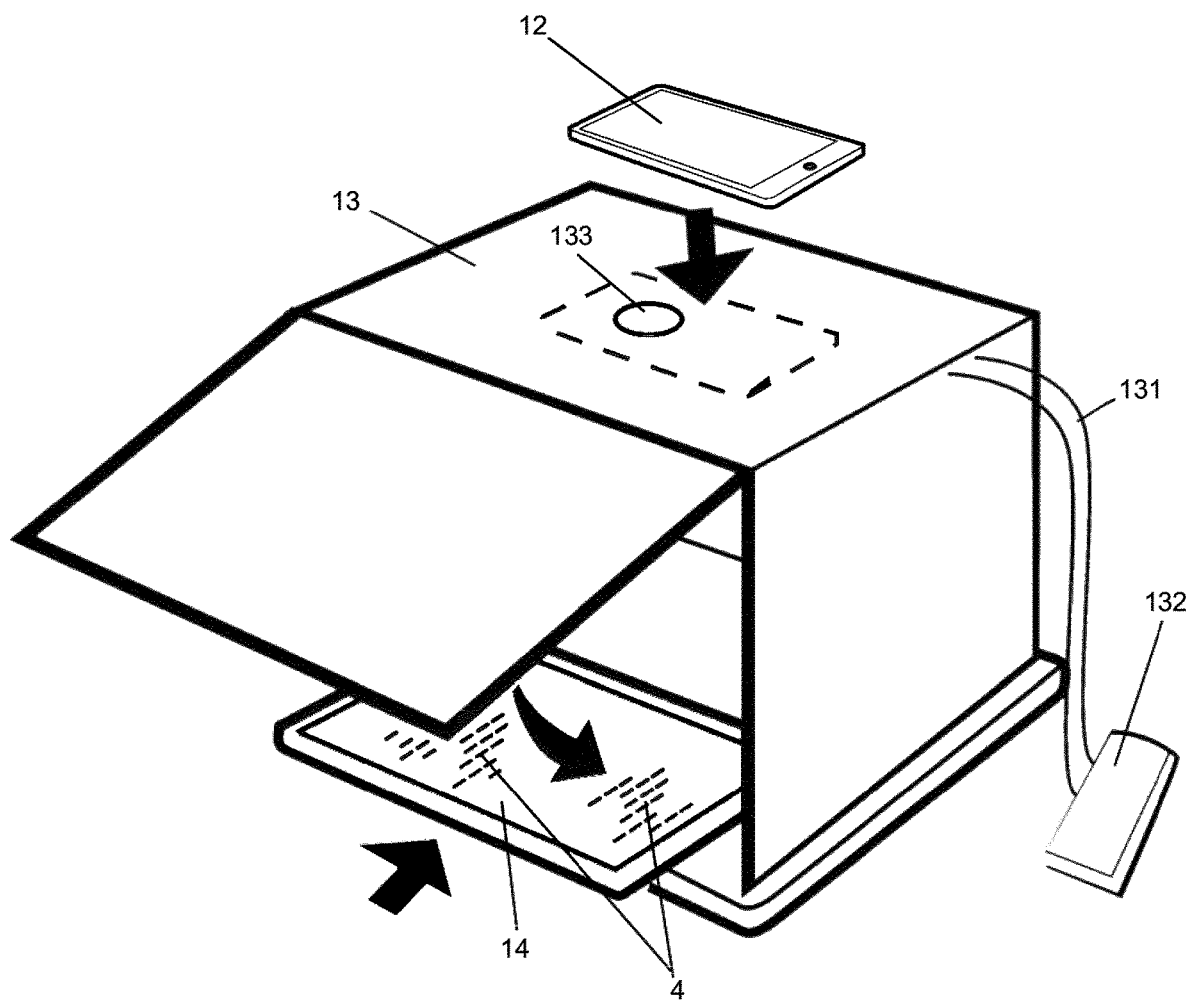
FIG. 2 shows a diagram illustrating schematically an exemplary light tent or light box 13 comprising a uniform light source 131 for the inner of the light tent 13 and a power supply 132. The light tent 13 has a hole 134 allowing to apply an optical sensor/camera 121/122, e.g. of a smart phone or another optical image capturing device 12.
Figure 4:
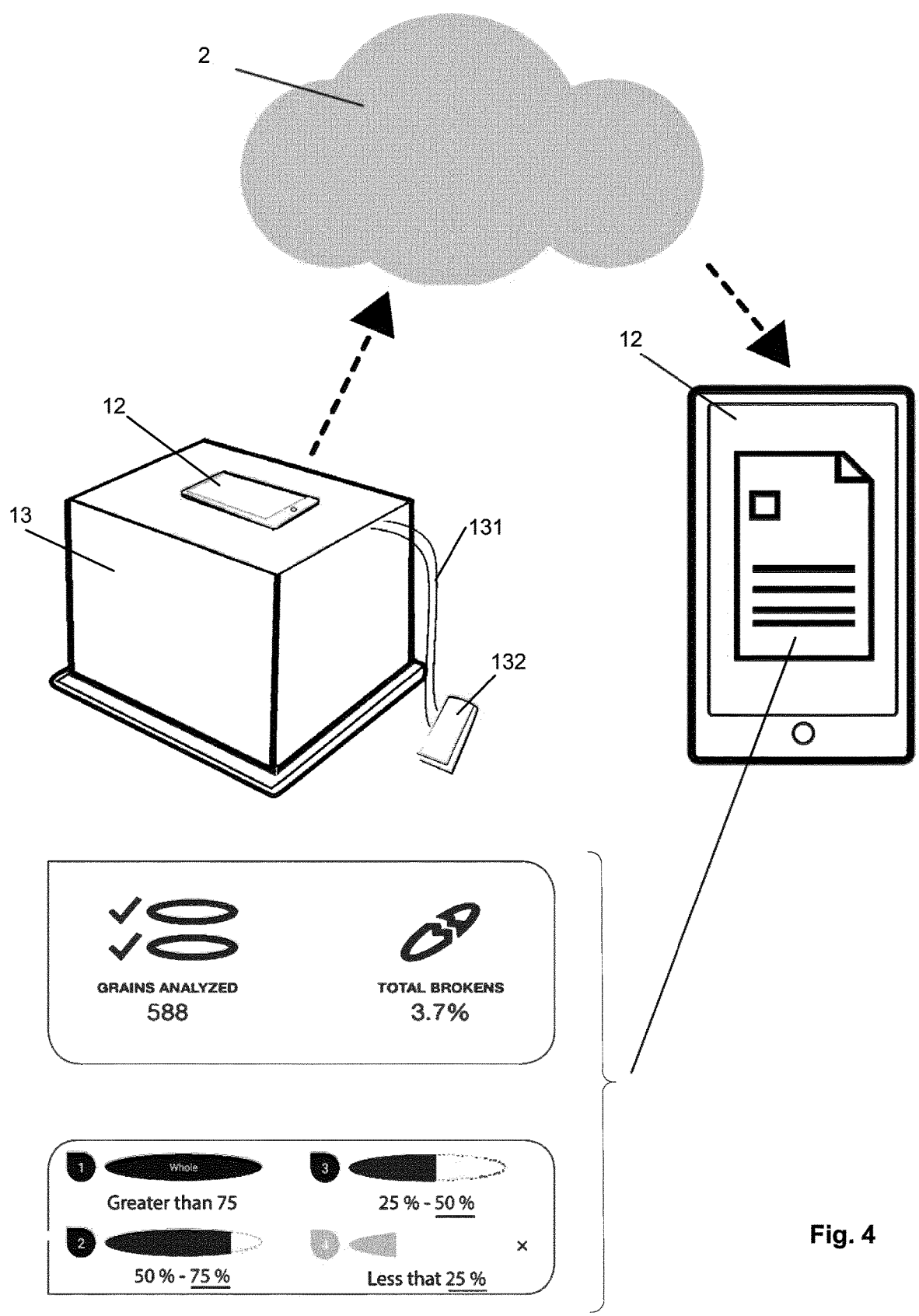
FIG. 4 shows a diagram illustrating schematically an exemplary industrialized system 1 for rice grain recognition and classification, wherein an optical image 123 is taken using the smart phone 12 and the light tent 13 transmitted over the data transmission network 2 to a digital platform 11, which response with the appropriate rice recognition analysis displayed on the smart phone 12.
Figure 5:
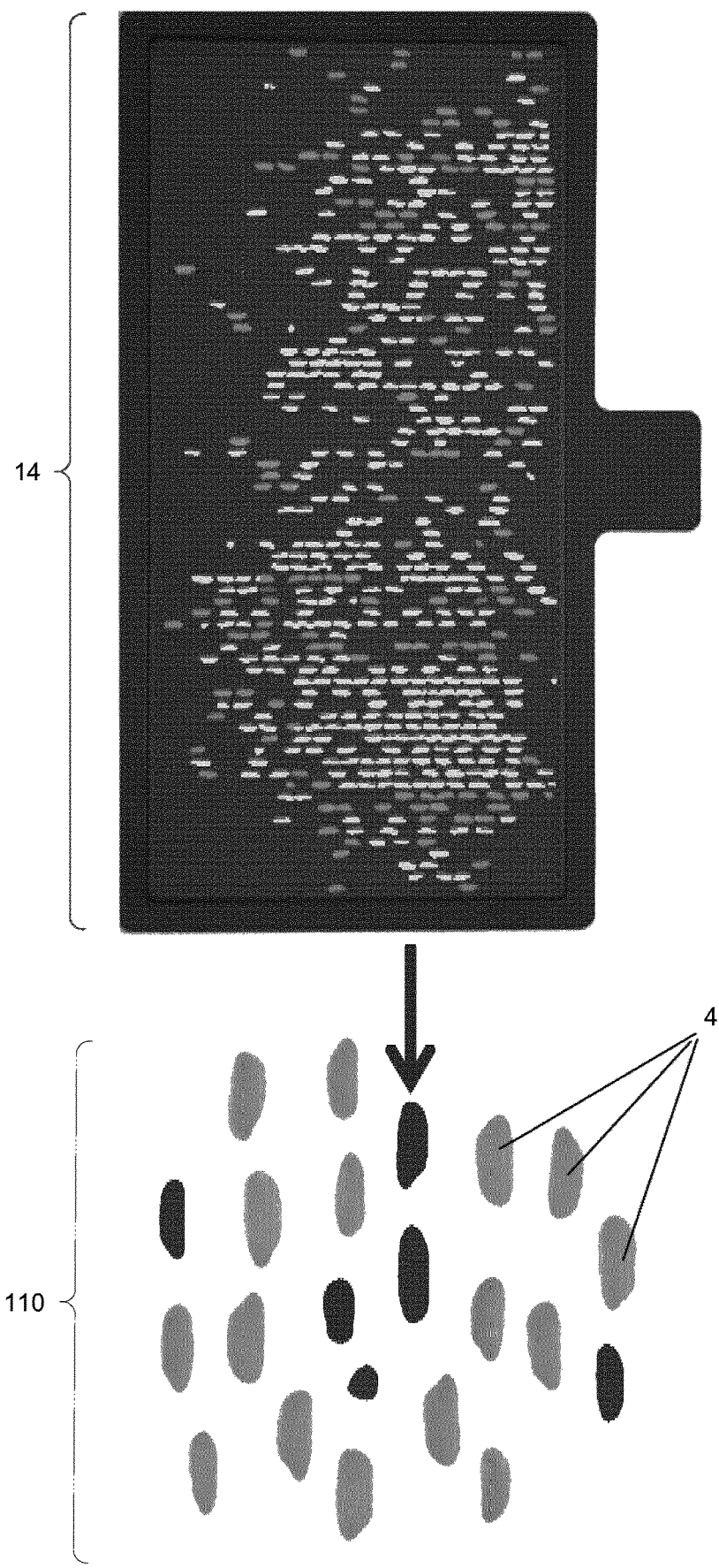
FIG. 5 shows a diagram illustrating schematically an exemplary segmentation by a segmentation module 110 segmenting the captured optical image 123 for grains 4 by identifying optical image 123 segments capturing grains 4 or grain parts.
Figure 6:
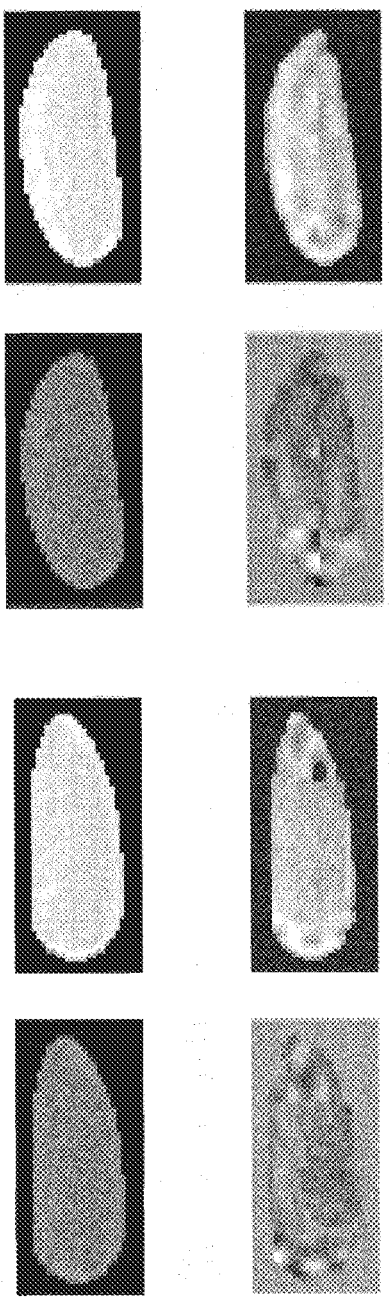
FIG. 6 shows a diagram illustrating schematically an exemplary feature extraction process by a feature extractor 111 extracting measurable grain features 41 from the identified grains 4 or grain parts in the optical image 123, the features describing different parametrized aspects of the grains 4 by a feature extraction process 1111 at least comprising shape parameter values 411 and/or color parameter values 412 and/or spatial parameters 413 and/or geometric parameters 414.
Figure 7C:
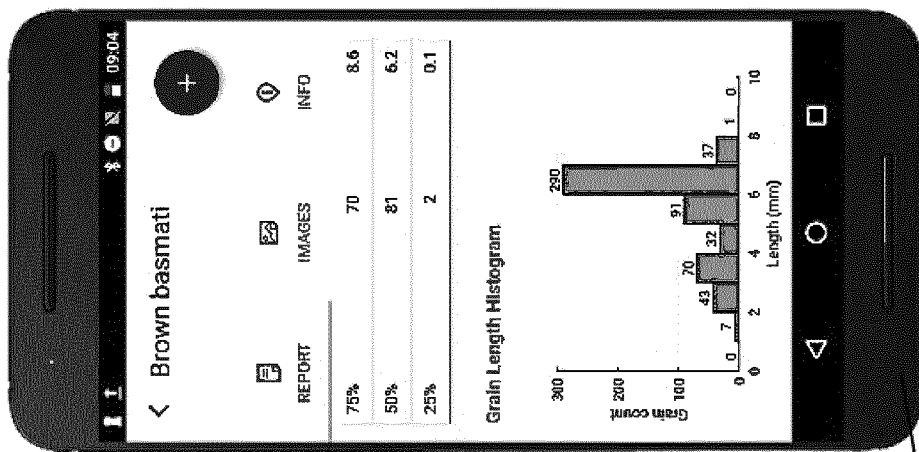
FIGS. 7 (comprising FIGS. 7$a$-7$c$), 8 (comprising FIGS. 8$a$-8$d$) and 9 (comprising FIGS. 9$a$-9$d$) show schematically exemplary response screens of a Mobile App of smart phone 12 upon grain recognition by the system 1.
Figure 7B:
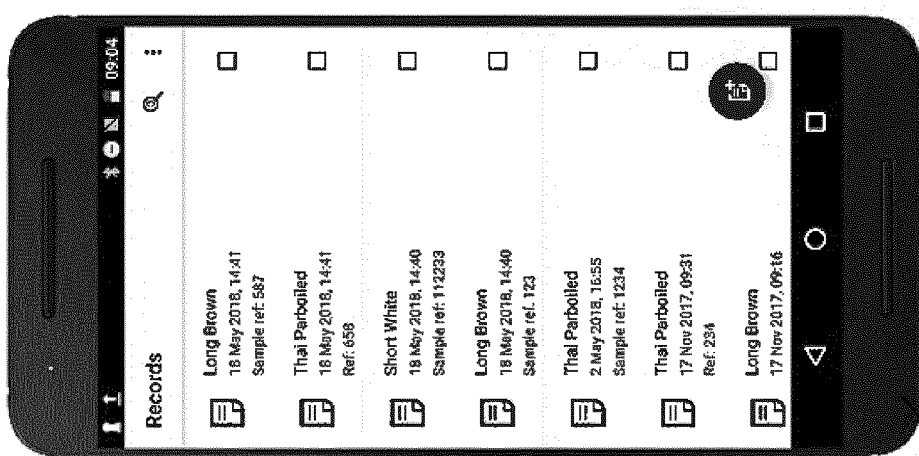
Figure 7A:
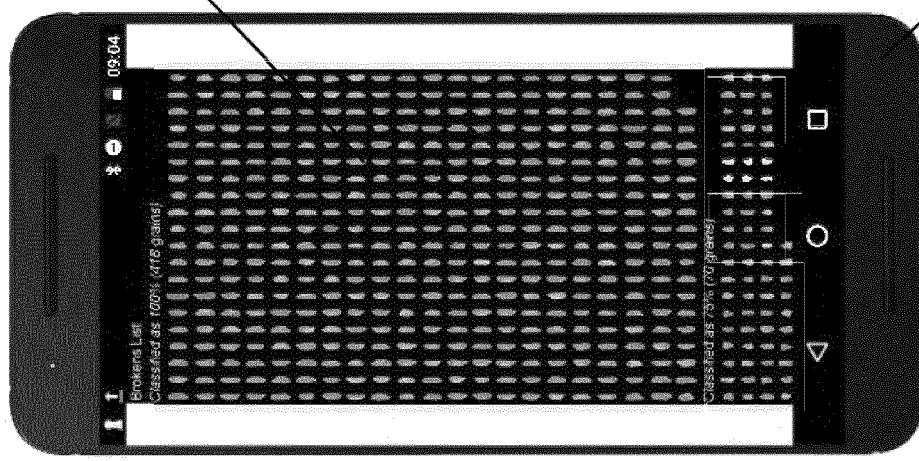
Figures 9A, 9B, 9C, 9D:
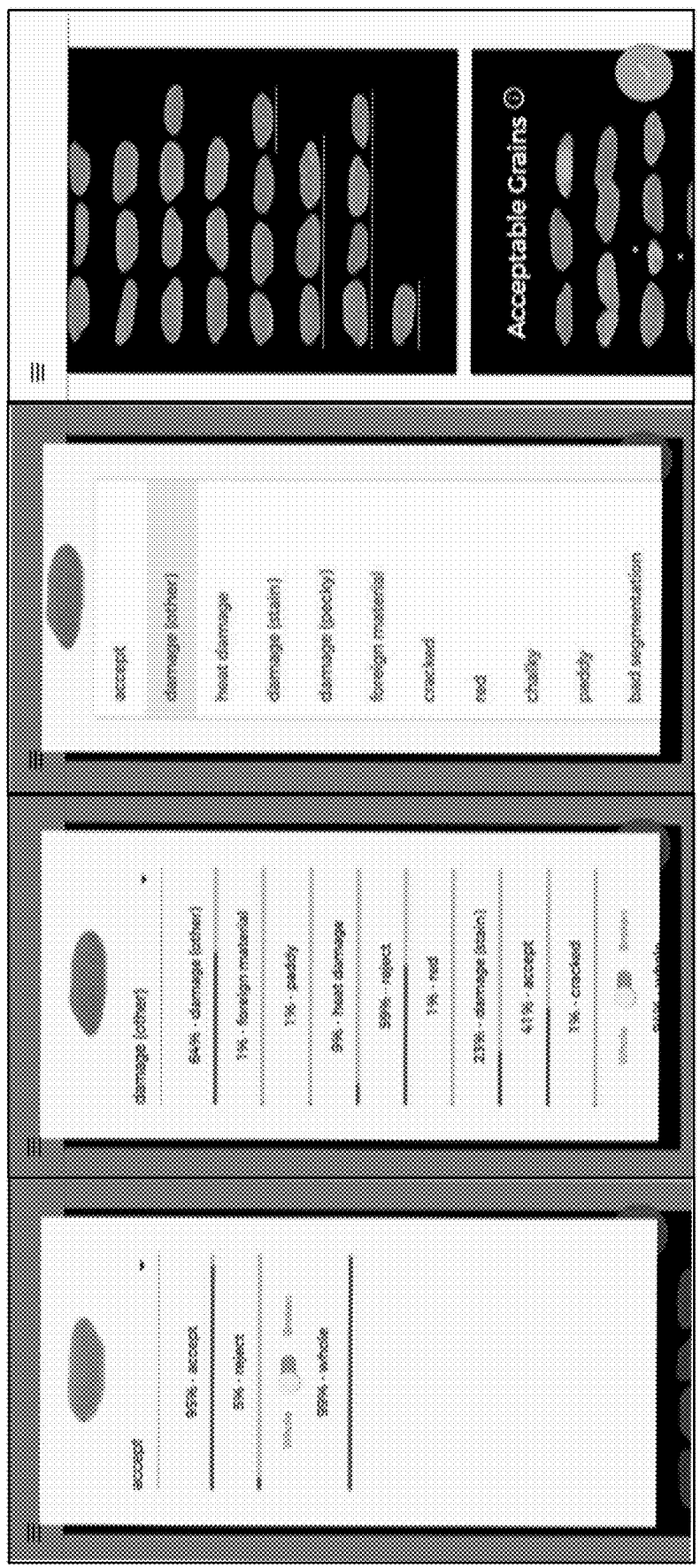
FIG. 9$d$ additionally shows a screen providing the feedback loop 1132 for the iterative retraining process 1131.
Figure 10:
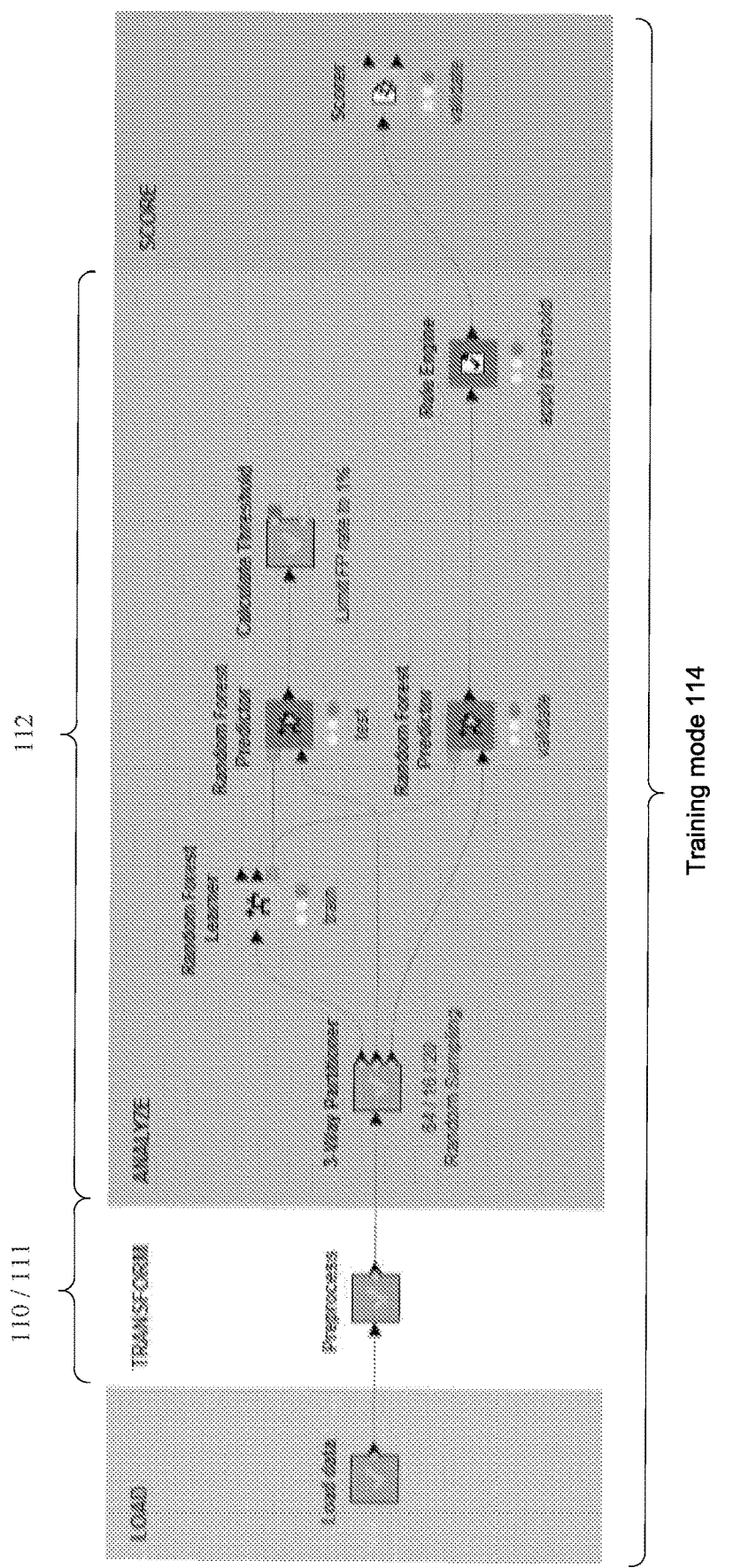
FIGS. 10-16 show diagrams illustrating schematically a digital system 11 in the exemplary training mode 114.
Figure 11:
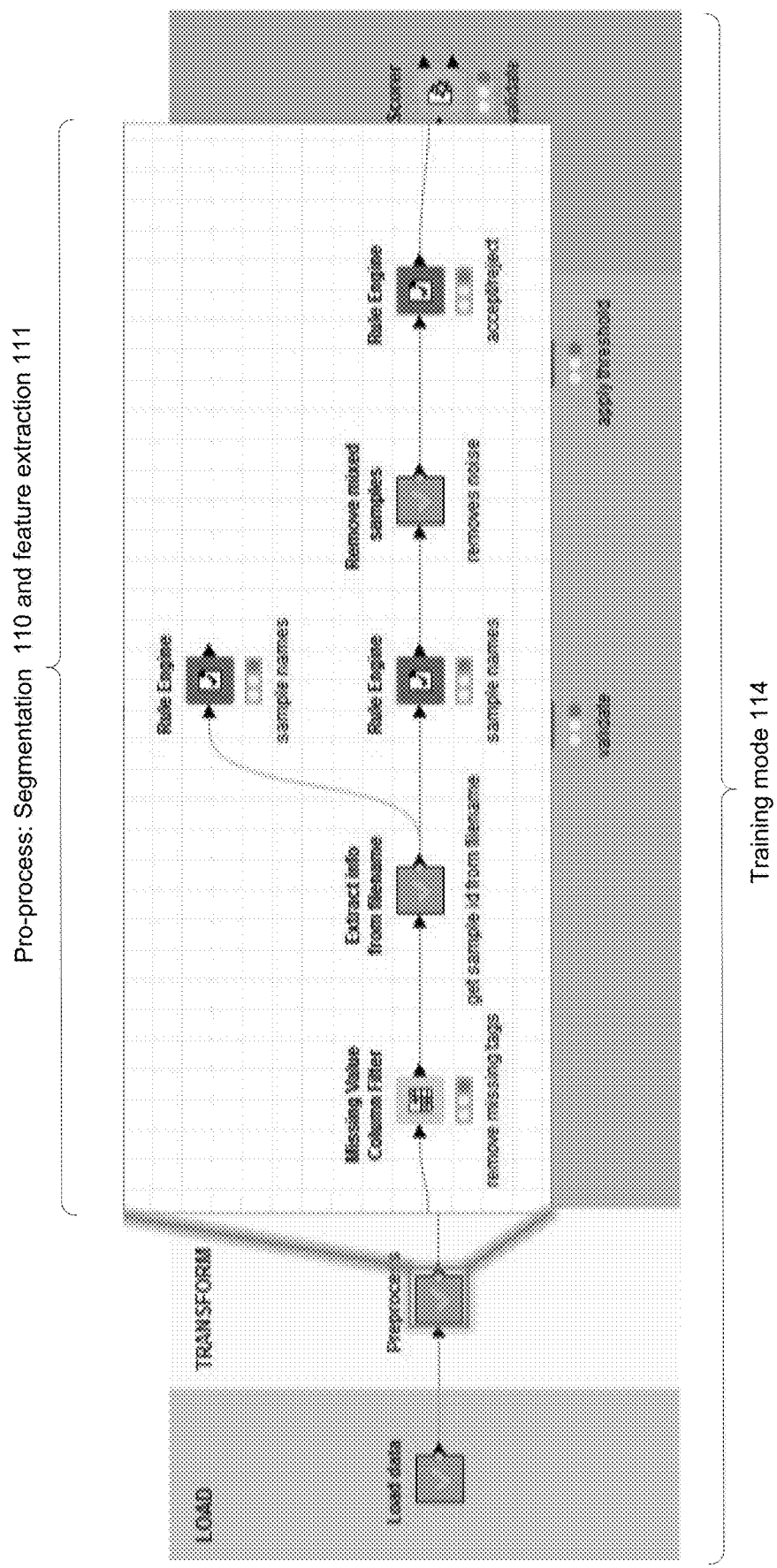
Figure 12:
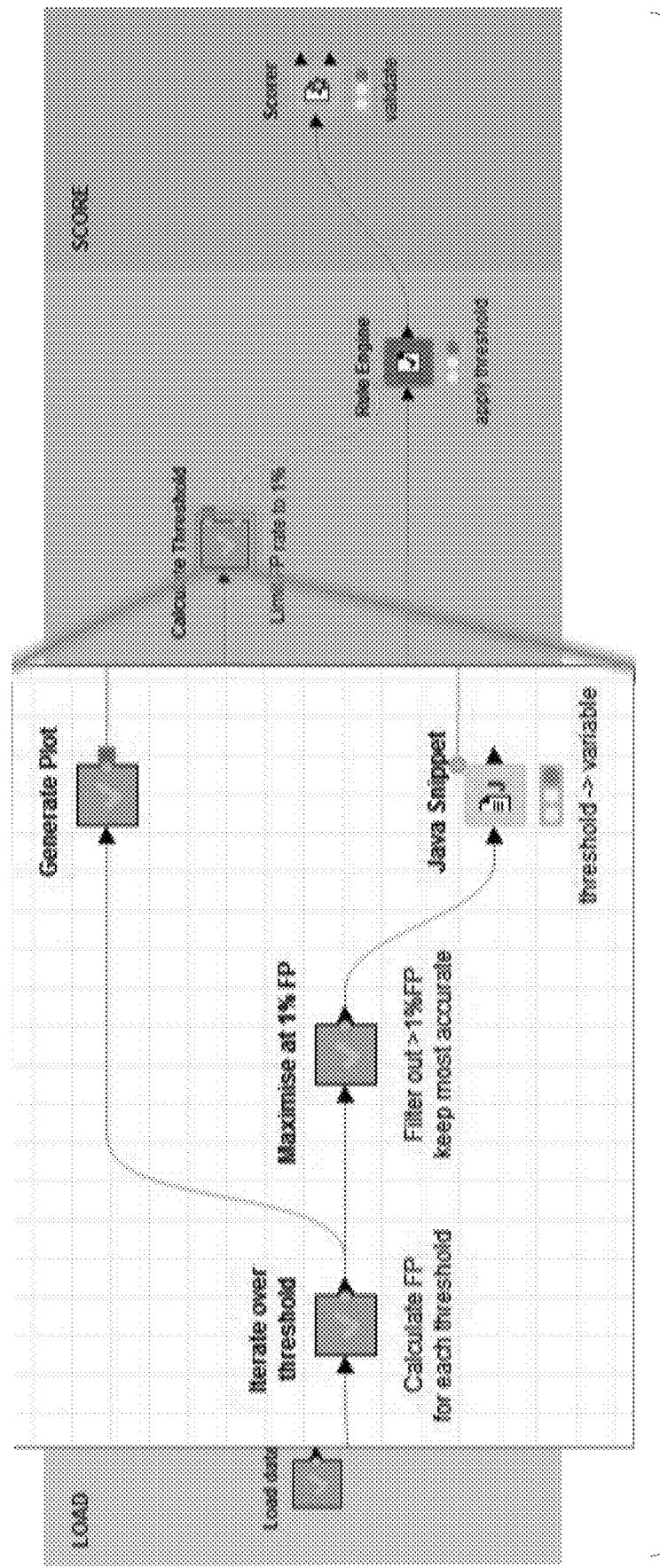
Figure 13:
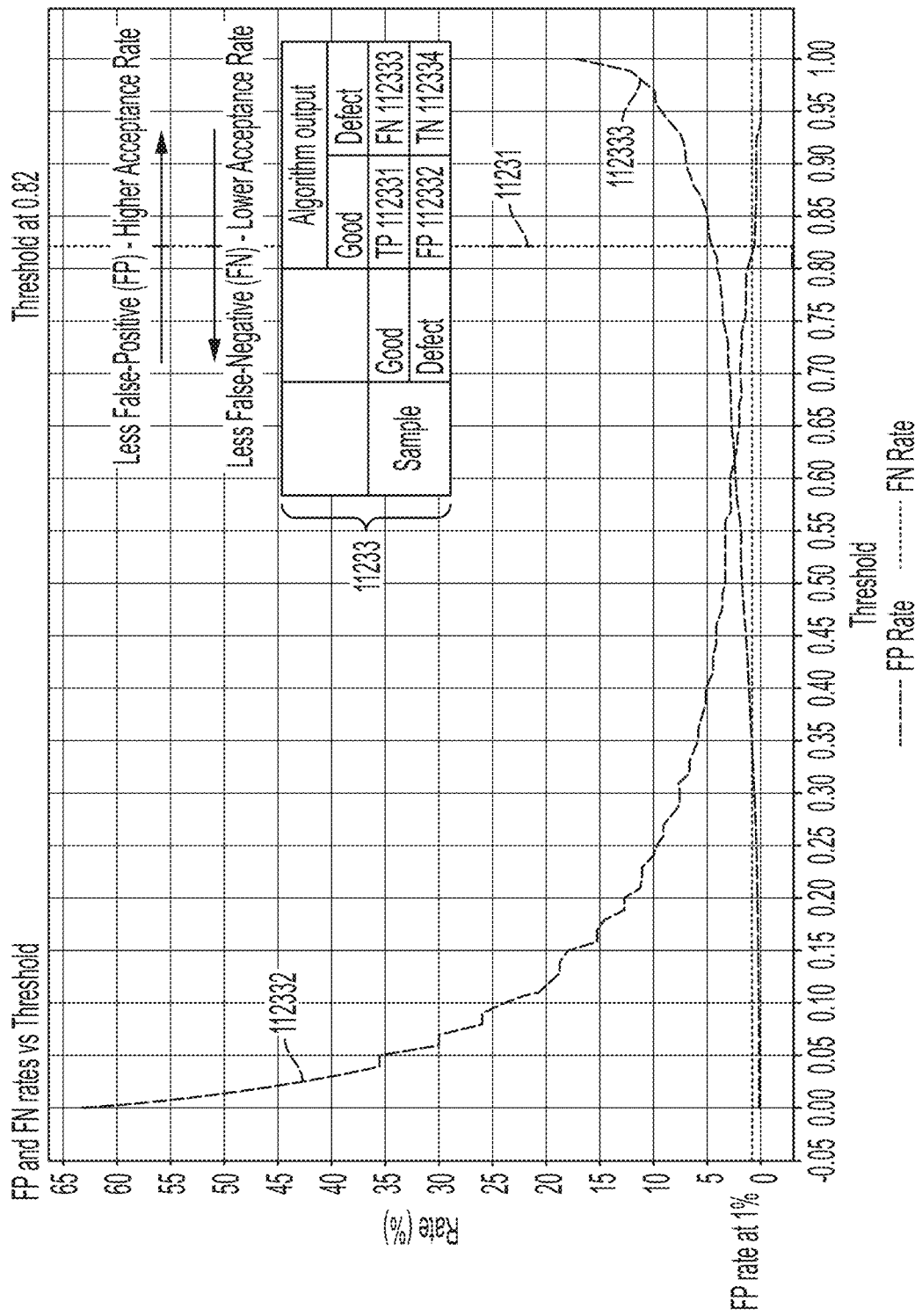
Figure 14:
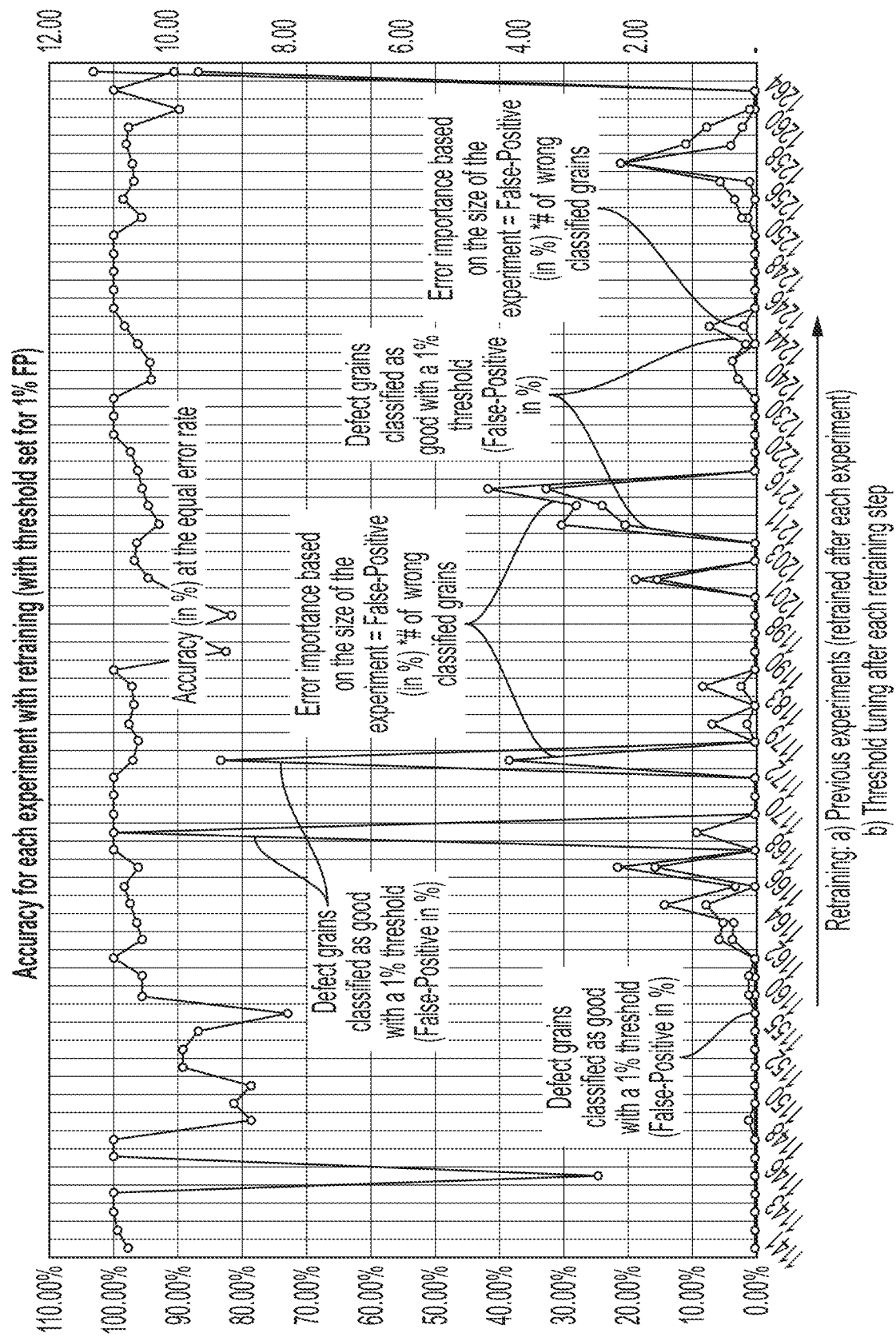
Figure 15:
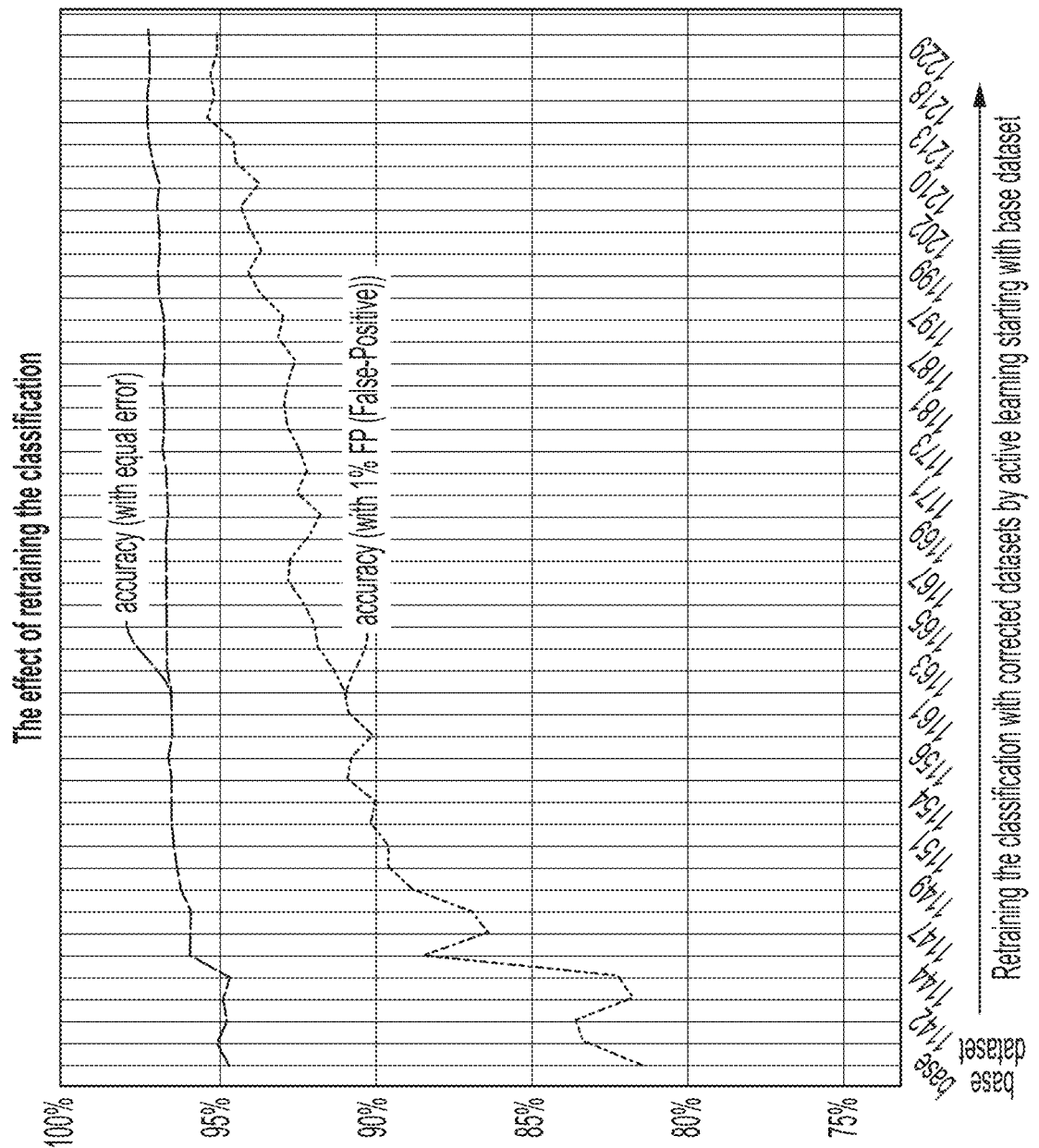
Figure 16:
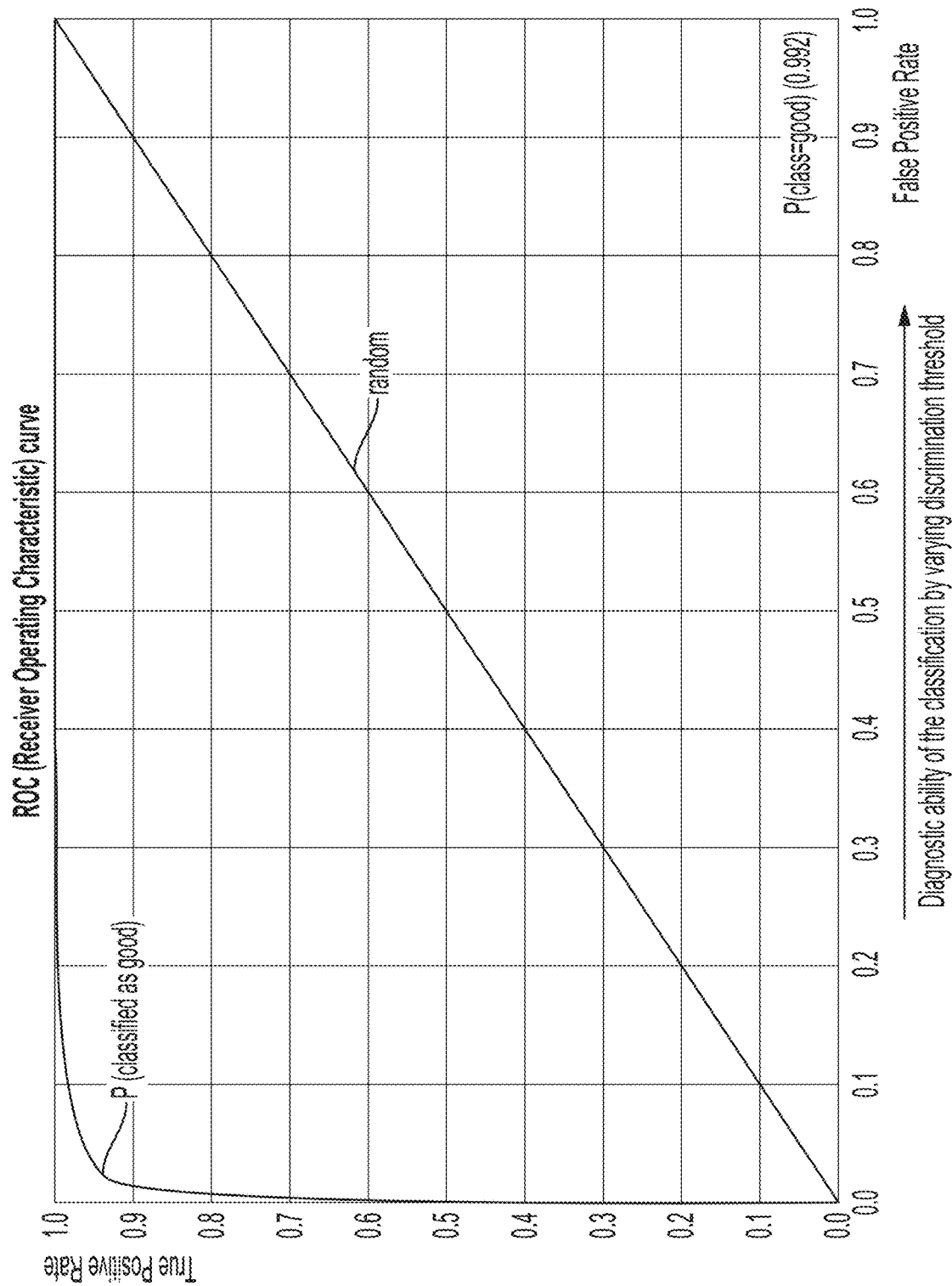
Figure 17:
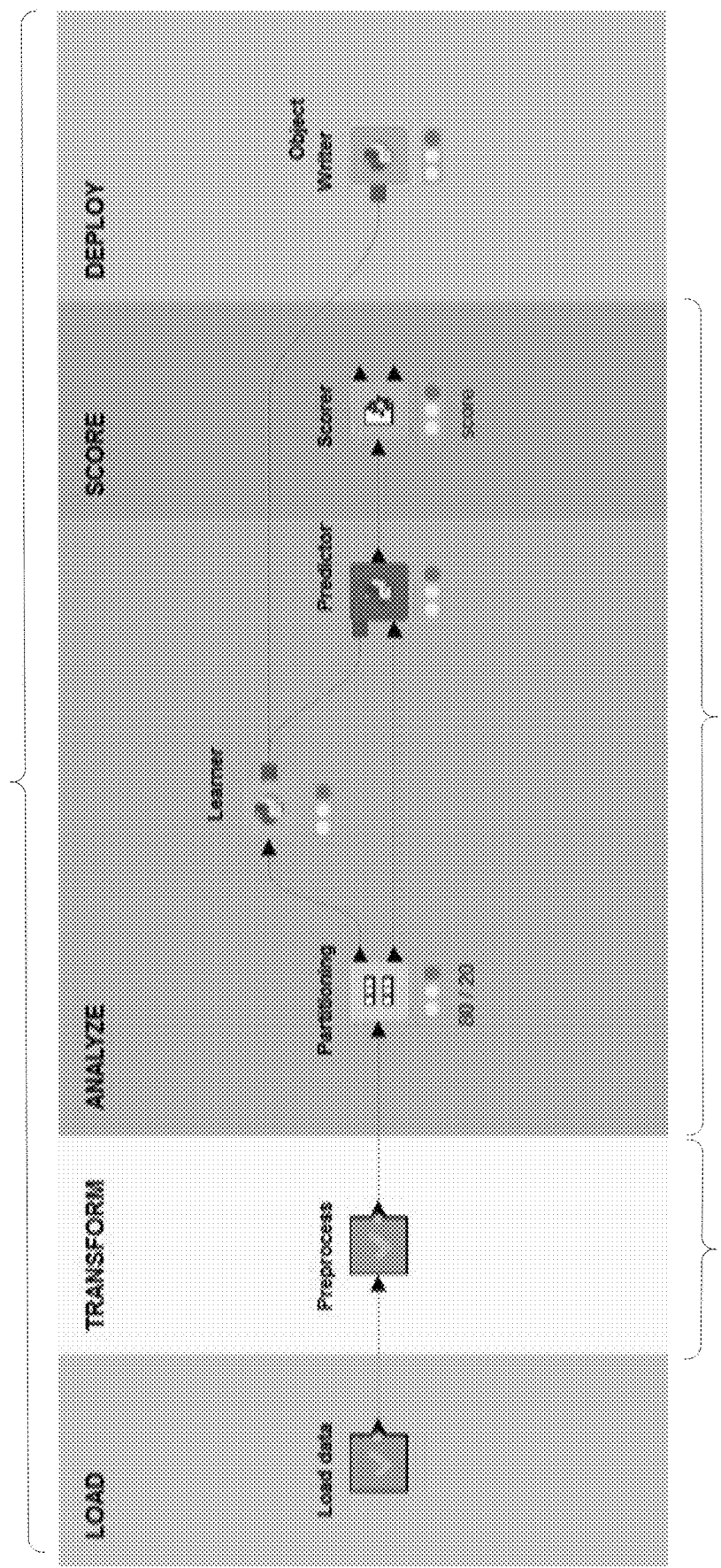
FIG. 17 show a diagram illustrating schematically the digital platform 11 operating in the prediction 115 for industrialization.
Figure 18:
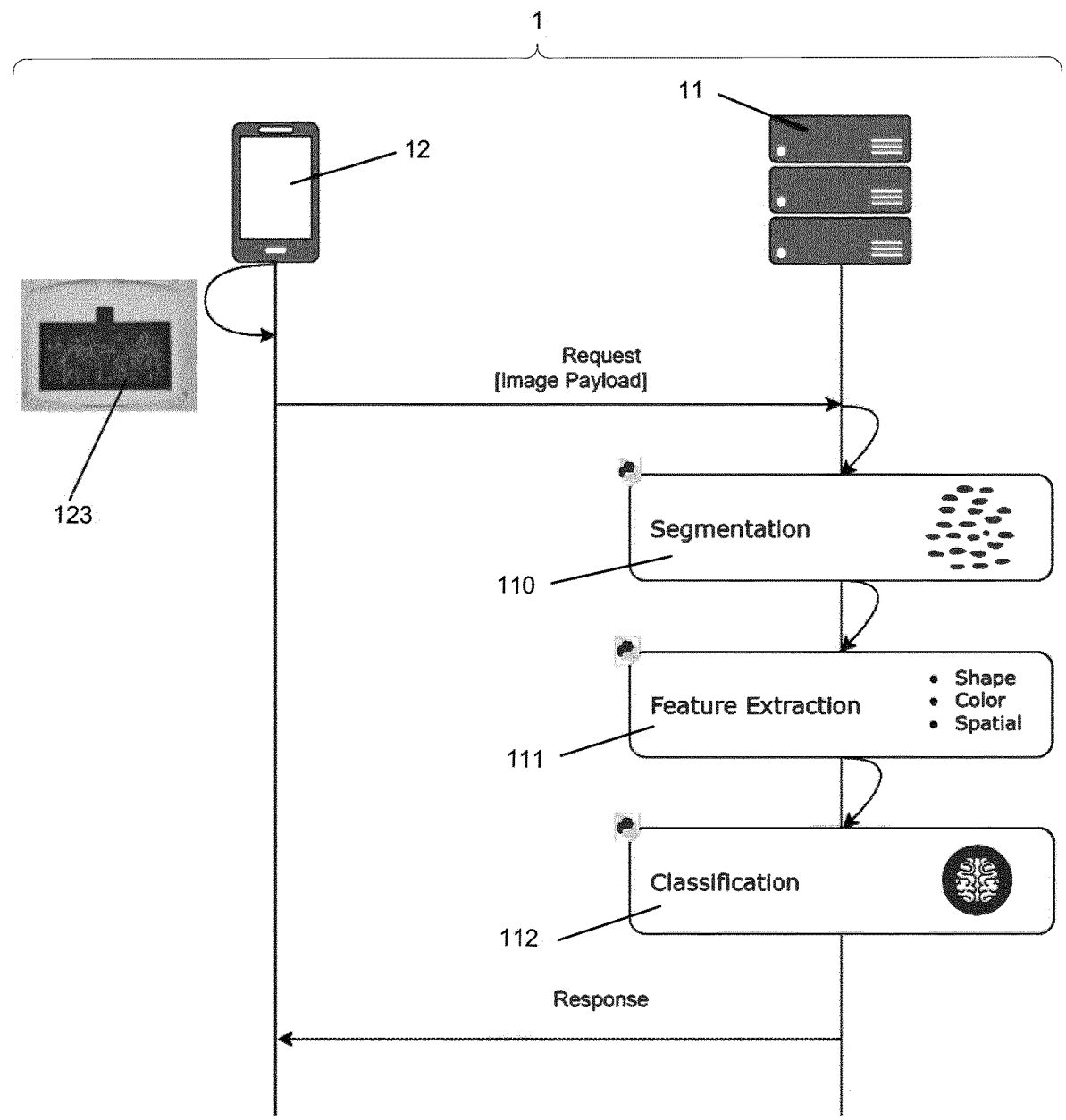
FIGS. 18 and 19 show a block diagram illustrating schematically an exemplary digital platform 11, comprising segmentation 110, feature extraction 111 and classification 112 comprising selection of the preferred machine-learning structure 11211, . . . , 1121$i$, and further minimization of the false-positive rate (FP).

FIGS. 1 to 22 illustrate, schematically, an architecture for a possible implementation of an embodiment of the inventive method and system 1 for rice grain recognition and classification. The industrialized system 1 for rice grain recognition comprises an optical capturing device 2 for capturing an optical image 123, the optical capturing device 2 comprising a data interface 124 for transmitting the optical image 123 to a digital platform 11 over a data transmission network 2, wherein the optical image 123 is analyzed by the digital platform 11 and appropriate response is provided to the optical capturing device 2 and/or a user device. The response can be e.g. transmitted in a http-request-response process or another request-response process between the digital platform 11 and the optical capturing device 2 and/or the user device, where in various results can e.g. be displayed to the user 5 on the optical capturing device 2 and/or the user device, as shown in the FIGS. 7 to 9. The optical capturing device 2 can e.g. be applied to a light tent 13 comprising a uniform light source 131. The optical capturing device 2 can e.g. be a mobile optical capturing device 2 which is applied externally to the light tent 13 via a camera hole in the light tent 13. The optical capturing device 2 can e.g. be a mobile smart phone, wherein the optical image 123 is captured by a camera 121 of the mobile smart phone using a dedicated mobile app and transmitted via one of the data transmission interfaces 124 of the mobile smart phone over the data transmission network 2 to the digital platform 11.

The digital platform 11 comprises a segmentation module 110 segmenting the captured optical image 123 for grains 4 by identifying optical image 123 segments capturing grains 4 or grain parts.

The digital platform 11 comprises a feature extractor 111 extracting measurable grain features 41 from the identified grains 4 or grain parts in the optical image 123, the features describing different parametrized aspects of the grains 4 by a feature extraction process 1111 at least comprising shape parameter values 411 and/or color parameter values 412 and/or spatial parameters 413 and/or geometric parameters 414. In particular, the measurable grain features 41 can e.g. comprise physical properties such as length, width, translucency, degree and/or frequency and/or type of broken grains, color, age, grain weight, hardness, vitreousness (Grain vitreousness is an optical property. Based on vitreousness, grains can be classified into three main classes: vitreous, mealy and piebald. Vitreous grains differs from non-vitreous by kernel appearance (starchy and opaque); vitreous grains are typically considered better quality than non-vitreous kernels, because of higher quality protein, color and uniform coarser granulation), moisture contents, and/or protein content. The extracted features 41 serve as input parameters and input parameter values for the machine learning structures 11211, . . . , 1121$i$, i.e. the selected artificial neural network or machine learning algorithm, during the training mode 114 and/or prediction mode 115. The feature extractor 111 extracts up to 100 and more different grain features 41. In particular optically extractable features can be essential, e.g. comprising physical grain properties of rice, as discussed above, as size, shape, color, uniformity, and general appearance. Other factors e.g. contributing to general appearance of rice can be also used as cleanliness, free from other seeds, vitreousness, translucency, chalkiness, color, damaged and imperfect kernel. For extracting, determining and/or measuring of the grain size parameters, grain can be e.g. categories into three main groups (i) length (ii) shape and (iii) weight, the length is the measure of the rough, brown, or milled rice kernel in its highest dimension, while shape is the ratio of length, width, and thickness, and for the case of weight is determined by using 1,000-kernel weight. For example, a long-grain type can be categorized by the feature extractor 111 having a length of 6.61 to 7.5 mm, a shape (ratio) of over 3, and a weight of 15-20 mg; a medium-grain type can be categorized having a length of 5.51 to 6.6 mm, a shape (ratio) of 2.1-3, and a weight of 17-24 mg; and a short-grain type can be categorized having a length of up to 5.5 mm, a shape (ratio) of up to 2.1, and a weight of 20-24 mg.

Test weight can be another measured and extracted feature 41 by the feature extractor 111. This feature 41 is related to bulk density, and can e.g. be used as an indicator or as a measure for the relative amount of foreign material or immature kernels. The average test weight per bushel of rough rice depend on the rice type and region, and can e.g. be 45 lb or the like. Impurities and damaged rice can also be extracted as a feature 41 of the rice grains. In particular, for example, presence of sand and stones will increase the weight of grain and damage rubber when send to the miller. Impurities and damaged rice contains dockage, damaged kernels, chalky grains, red rice, broken seed or kernels and odors. The main objective of rice milling is to remove the outer layer (hull), bran and germ with minimum damage of endosperm. Milling quality of rice can be associated with other extracted features 41 used as input parameters and input parameter values for the machine learning structures 11211, . . . , 1121$i$ during the training mode 114 and/or prediction mode 115 from the feature extractor 111. These features can also be measured by using milling yield. Milling yield varied depends on several factors such as grain types, varieties, chalkiness, drying and storing conditions, other includes environmental conditions and moisture contents at harvest. The extracted features 41 associated with the milling quality can e.g. be measured by two parameters (i) total yield and (ii) head yield, also another parameters like degree of milling and broken rice can be e.g. used by the feature extractor 111 to measure milling quality an express in percentage. By definition milling quality is the ability of rice kernels to stand milling and or polishing without breakage, and to yield higher amount of recovery. Another extracted feature 41 can e.g. be the amylose content of the rice grains. Like other cereal rice is good sources of starch especially amylose. It is composed more than 80% starch and at molecular level starch contains amylose (linear chains glucose of a (1-4) linkages) and amylopectin (branched chain glucose with a (1-6) linkage. In terms of amylose rice can be classified as waxy 0-2%, very low 2-10%, low 10-20%, intermediate 20-25% and high 25-32% (rice dry basis). Starch content (amylose) of rice can e.g. also be a measure in grain yield, processing and palatability. A further extracted feature 41 can e.g. be the gelatinization temperature. This feature 41 is related to other possible extracted features 41 such as granula size, molecular size of starch fraction. Like other features 41, it is typically also influenced by environment measuring parameters such as ripening temperature, genetic and rice varieties as well as cooking time. The gelatinization temperature feature 41 is directly related to amylose contents; the higher the amylose the higher the gelatinization temperature, hence high waxy rice has higher gelatinization temperature than waxy or very low waxy rice. Another extracted feature 41 by means of the feature extractor 11 can e.g. be the degree of milling, appearance (color), damaged (broken) and percentage of chalky kernels. Thus, three important properties features 41 can e.g. be size, color and condition (kernels damage), since these properties direct allow measuring quality, milling percentage and other processing conditions. However, all extractable property features 41 can e.g. be important for input to the machine learning structures 11211, . . . , 1121$i$ during the training mode 114 and/or prediction mode 115, as e.g. kernels with chalky which are not desirable because producing lower milling yields after processing and easy break during handling.

The digital platform 11 comprises a classifier 112 with a selector 112 for sequential selecting of a plurality of machine learning structures 11211, . . . , 1121$i$, the selector 1122 applying the different machine learning structures 11211, . . . , 1121$i$ to the extracted grain features 41 for rice grain recognition, and selecting the best of the applied machine learning structures 11211, . . . , 1121$i$. The selectable machine learning structures 11211, . . . , 1121$i$ can e.g. comprise at least one neural network structure. The at least one neural network structure can e.g. comprise at least one Convolutional Neural Networks (CNNs). The selectable machine learning structures 11211, . . . , 1121$i$ can also comprise other machine learning structures 11211, . . . , 1121$i$ as deep learning or deep structured learning or any other applicable machine learning producing appropriate results during recognition, wherein the deep learning structures are based on artificial neural networks with representation learning. The learning in the learning mode 114 can e.g. be supervised, semi-supervised or unsupervised. However, supervised learning modes 114 may be a preferred embodiment variant, in particular in relation to the possible active learning structure of the present invention 113. Deep learning structures 11211, . . . , 1121$i$ can e.g. comprise deep neural networks structures and/or deep belief networks structures and/or recurrent neural networks structures and/or the already discussed convolutional neural networks structures etc. In the case of supervised learning, the proposed machine learning structures 11211, . . . , 1121$i$ can be trained by an optical dataset annotated by a human expert (in particular in the active learning structure 113), outperformed the overall classification results produced by human raters and/or a rule-based selection. This can e.g. particularly be provided using separated samples, e.g. using the training trays 141, and the sample trays 142. In the supervised learning mode 114, the extracted features serve as input parameters, while the output can e.g. be a binary classifier system (good/bad) or involve a more granular classification output representing more granular classification features, in particular involving uncertainty features regarding the performed classification.

For the selection of the plurality of machine learning structures 11211, . . . , 1121$i$, the selector 1122 of the classifier 112 can e.g. comprise a sampling process 11222 based on a random sampling process 112221, wherein a machine learning structures 11211, . . . , 1121$i$ is selected by the selector 112 randomly, such that each machine learning structures 11211, . . . , 1121$i$ has the same probability of being chosen during the sampling process. Each of the selected machine learning structures 11211, . . . , 1121$i$ can e.g. be trained based on a random forest structure providing an ensemble learning process for the classification of the grains 4 using the plurality of machine learning structures 11211, . . . , 1121$i$. Each of the selected machine learning structures 11211, . . . , 1121$i$ can e.g. be trained by means of a random forest learner 112222 providing an appropriate random forest predictor 112223, wherein each random forest predictor 112223 is optimized by varying an appropriate threshold 11231 by means of the threshold trigger 1123, and wherein the variation of the discrimination threshold 11231 varies the diagnostic ability of the binary classifier system 112 varies related to the variation of the discrimination threshold 11231.

The selected best of the applied machine learning structures 11211, ..., 1121i is further optimized by varying an appropriate threshold 11231 by means of a threshold trigger 1123, wherein the variation of the discrimination threshold 11231 varies the diagnostic ability of the binary classifier system 112 varies related to the variation of the discrimination threshold 11231. The threshold trigger 1123 can e.g. trigger an optimal threshold parameter value 112311 in a 2-dimensional optimization process measuring the true-positive rate 112331 against the false-positive rate 112332 at various threshold settings optimizing the classifier's 112 sensitivity as a function of its fall-out. The threshold parameter value 112311 can e.g. be optimized by the threshold trigger 1123 in such a way that the false-positive rate 112332 is limited to a predefined trigger value. The predefined trigger value for the false-positive rate 112332 can e.g. be 1%.

Additionally, an active learning structure 113 can e.g. be based on a confusion matrix 11233 comprising the values of True Positive (TP), False Negative (FN), False Positive (FP) and True Negative (TN) for the classified rice grains, providing a feedback loop as an iterative retraining process 1131 to a user or human expert 5, wherein the system 1 is retrained based on the feedback parameters of the feedback loop 1131.

In the embodiment variant, the digital platform 11 comprises a split processing structure with a cloud computing platform 11a providing the rice grain recognition as software as a service (SaaS) and a machine learning/data mining system 11b providing the machine learning and data mining processing through a modular data pipelining structure. In particular, further performance improvements can e.g. be achieved by using KNIME (Konstanz Information Miner) for the machine learning/data mining system 11b, as a data analytics, reporting and integration structure. The KNIME structure allows to integrate various components for machine learning and data mining through its modular data pipelining concept. A graphical user interface and use of JDBC allows assembly of nodes blending different data sources, including preprocessing (ETL: Extraction, Transformation, Loading), for modeling, data analysis and visualization without, or with only minimal, programming.

As discussed above, in order to cope with the object of the invention, the inventive system uses more advanced classification structures, e.g. using KNIME (Konstanz Information Miner). KNIME is a data analytics, reporting and integration structure. KNIME integrates various components for machine learning and data mining through its modular data pipelining concept. A graphical user interface and use of JDBC allows assembly of nodes blending different data sources, including preprocessing (ETL: Extraction, Transformation, Loading), for modeling, data analysis and visualization without, or with only minimal, programming. To some extent as advanced analytics possibilities of KNIME can be considered as a SAS alternative.

The use of more advanced classification structures means that a more intricate structure and processing algorithm needed to be developed to decide whether a given grain 4 is good or bad, broken or whole. In a first approach, Neural Networks were used, specifically designed for image recognition to determine the quality of the grains. Convolutional Neural Networks (CNNs) can provide very accurate results in image recognition but require an extremely large dataset to be properly trained. However, the datasets that are available, are typically not large enough to yield promising results, with only 85% accuracy. In order to converge more quickly to the required accuracy levels, different machine-learning algorithms were tested, and their efficiencies were compared on an available dataset. In order to do so, features have to be extracted from each image to run through the classification. Features 41 are extracted from the images to describe different aspects of the grain: shape 411, color 412, special characteristics 413, geometric characteristics 414, etc.

A proper accuracy metric needs to be defined to compare the algorithms accurately. As in many defect-detection applications of machine learning, missing a defect data point is a costlier mistake than considering a good data point to be defect. The tool used to understand this misclassification is commonly called a confusion matrix. It shows four numbers: True Positive (TP) 112331, False Negative (FN) 112334, False Positive (FP) 112332 and True Negative (TN) 112333. TP represents the number of good grains that were correctly classified as good, while FN represents the number of good grains that were classified as defective. Conversely, TN represents the number of defective grains correctly classified as such, while FP represents the number of defective grains that were classified as good. It is this last metric that is selected to be as low as possible while keeping the overall accuracy as high as possible.

Once the algorithm was selected, the FP rate 112332 needs to be minimized even further. To achieve this, it has to be observed how the FP rate 112332 behaved with respect to a modification of the model's threshold value. For any given grain 4, the algorithm outputs a pair of values corresponding to the probability of the grain 4 belonging to the good or defective class. It is then up to the system and/or the operator to determine the threshold probability for a grain to be classified as good. A higher threshold means a more selective classification and less FP 112332. However, many false negative classifications arose due to the raising of the threshold; some of the new FN 112334 grains still had a relatively high probability of being good but were below the threshold. Therefore, defect grains that had a probability of being good above 50% were considered as "acceptable" and were not classified in any final class. If all "acceptable" grains are removed from the final classification statistics, the overall FN rate is drastically decreased.

With this classification uncertainty, the next step is to include the possibilities of human correction in an inventive active-learning process in the inventive system. Indeed, although the model is already quite performant, new issues can quickly arise that would make its performance drastically drop: new varieties of defect rice, different shades of rice from different regions, etc. In order to improve the overall classification, adapt to a more varied dataset, and reduce the model's acceptable rate, an iterative retraining process was defined. For example, a web app is developed that gives the user the possibility to upload new images, observe the model's classification, correct them when needed, and share them for cross-validation. Once the rice experts have corrected a series of reports, they can then be parsed along with the new rice-grain images and use this fresh data to retrain the classification model.

With the platform developed, the rice experts can test the model, correct the output, and provide feedback to the system on how it is behaving. The first few experiments quickly revealed some flaws in our initial training of the model. Several of the various defect types were severely underrepresented in the used training set and were therefore not recognized as defect grains, causing lots of FP results. This was quickly corrected once the model is retrained. Indeed, with more data from these rare classes, the model became more versatile concerning the types of rice defects it is able to recognize. As the model becomes more and more familiar with various defect types after each retrain, this kind of experiment with many FP becomes less frequent.

The presented project provides a relevant example of how machine learning-based computer vision techniques can be innovatively applied, used and help increase consistency in industrial quality control. It also reveals how collecting a quality initial dataset can be challenging, and how closing the feedback loop with domain experts is essential to achieve highly accurate predictions.

REFERENCE LIST

1 Industrialized system for rice grain recognition
11 Digital platform
11a Cloud computing platform
11b Machine learning/data mining platform by modular data pipelining
110 Segmentation module (Pre-Processing)
1101 Segmentation process
111 Feature Extractor (Pre-Processing)
1111 Feature extraction process
112 Classification module/Classifier system (Processing)
1120 Classification process
1121 Machine-based recognition intelligence
11211, . . . , 1121i Machine learning structures
1122 Selector
11221 Confusion matrix
11222 Sampling process
112221 Random sampling process
112222 Random forest learner
112223 Random forest predictor
1123 Threshold trigger
11231 Variable threshold parameter
112311 Threshold value ($tv_{1...i}$)
112312 Probability for positives at a specific $tv_i$
11232 Threshold probability for positives
11233 Confusion matrix
112331 True-Positive rate (TP) (probability of detection)
112332 False-Positive rate (FP) (probability of false alarm)
112333 True-Negative rate (TN)
112334 False-Negative rate (TN)
113 Active learning structure
1131 Iterative retraining process
11311 Corrective adaption of optical recognition
11312 Retrain request
1132 Feedback loop
114 Training mode
115 Prediction mode
12 Optical image capturing device
121 Camera
122 Optical sensor
123 Optical image
124 Data interface
13 Light tent
131 Uniform light source
132 Power supply
133 Optical sensor/camera hole
14 Trays
141 Training trays
142 Sample trays
2 Data transmission network
3 Sorter
31 Optical sensor
32 Sorting unit
33 Sorting and cleaning process
331 Color
332 Broken
333 Other material (sand, rocks, glass, . . . )
4 Rice grains
41 Feature parameters of the grains
411 Shape parameters
412 Color parameters
413 Spatial parameters
414 Geometric parameters
5 User/Human expert

The invention claimed is:

1. An industrialized system for rice grain recognition, the system comprising:
an optical capturing device for capturing optical images, the optical capturing device comprising a data interface for transmitting the optical images to a digital platform over a data transmission network, wherein the optical images are analyzed at the digital platform and a response to the rice grain recognition is provided to the optical capturing device and/or a user device; and
circuitry at the digital platform, the circuitry being configured to implement
a segmentation module segmenting the captured optical images for grains by identifying optical image segments capturing grains or grain parts; and
a feature extractor extracting measurable grain features from the identified grains or grain parts in the optical images, the features describing different parametrized aspects of the grains or grain parts by a feature extraction process at least comprising shape parameter values and color parameter values and/or spatial parameters and/or geometric parameters,
wherein, in a learning mode, the circuitry is configured to implement a classifier with a selector for sequential selecting of a plurality of machine learning structures, the selector applying the machine learning structures to the extracted grain features for rice grain recognition, and selecting an applied machine learning structure of the applied machine learning structures, which has a number of grains or grain parts classified as false positive regarding quality as low as possible while keeping an accuracy as high as possible, and
wherein the selected machine learning structure of the applied machine learning structures is further optimized by varying a discrimination threshold by a threshold trigger, wherein the classified false positives are further minimized to a determined threshold probability for a grain to be classified as good, so that a variation of the discrimination threshold varies a diagnostic ability of the system which is a binary classifier system related to the variation of the discrimination threshold.

2. The industrialized system according to claim 1, wherein the threshold trigger triggers an optimal threshold parameter value in a 2-dimensional optimization process measuring a true-positive rate against the false-positive rate at various threshold settings optimizing the classifier's sensitivity as a function of its fall-out.

3. The industrialized system according to claim 2, wherein the threshold parameter value is optimized by the threshold trigger in such a way that the false-positive rate is limited to a predefined trigger value.

4. The industrialized system according to claim 3, wherein the predefined trigger value for the false-positive rate is ≤1%.

5. The industrialized system according to claim 1, wherein the threshold trigger triggers an optimal threshold parameter value in a 2-dimensional optimization process measuring a true-positive rate against the false-positive rate at various threshold settings optimizing the classifier's sensitivity as a function of its fall-out by a confusion matrix.

6. The industrialized system according to claim 1, wherein an active learning structure based on a confusion matrix comprising the values of True Positive (TP), False Negative (FN), False Positive (FP) and True Negative (TN) for the classified rice grains or grain parts, providing a feedback loop as an iterative retraining process to a user or human expert, wherein the system is retrained based on feedback parameters of the feedback loop using a segmentation process of the segmentation module and/or the feature extraction process and/or the classification process in the training mode.

7. The industrialized system according to claim 1, wherein the machine learning structures comprise at least one neural network structure.

8. The industrialized system according to claim 7, wherein the at least one neural network structure comprises at least one Convolutional Neural Network (CNN).

9. The industrialized system according to claim 1, wherein the extracted grain features from the identified grains or grain parts of the optical images comprise at least shape parameters and/or color parameters and/or spatial parameters and/or geometric parameters of the grains or grain parts.

10. The industrialized system according to claim 1, wherein the optical capturing device is applied to a light tent comprising a uniform light source.

11. The industrialized system according to claim 10, wherein the optical capturing device is a mobile optical capturing device which is applied externally to the light tent via a camera hole in the light tent.

12. The industrialized system according to claim 1, wherein the optical capturing device is a mobile smart phone, and wherein the optical images are captured by a camera of the mobile smart phone using a dedicated mobile app and transmitted via a data transmission interface of the mobile smart phone over the data transmission network to the digital platform.

13. The industrialized system according to claim 1, wherein the circuitry comprises a split processing structure with a cloud computing platform providing the rice grain recognition as software as a service and a machine learning/data mining system providing the machine learning and data mining processing through a modular data pipelining structure.

14. The industrialized system according to claim 1, wherein, for the selection of the plurality of machine learning structures, the selector comprises a sampling process based on a random sampling process, and wherein a machine learning structure is selected by the selector randomly, such that each machine learning structure has the same probability of being chosen during the sampling process.

15. The industrialized system according to the claim 14, wherein each of the selected machine learning structures is trained based on a random forest structure providing an ensemble learning process for the classification of the grains or grain parts using the plurality of machine learning structures.

16. The industrialized system according to the claim 15, wherein each of the selected machine learning structures is trained by a random forest learner providing an appropriate random forest predictor wherein each random forest predictor is optimized by varying an appropriate threshold by the threshold trigger, and wherein the variation of the discrimination threshold varies the diagnostic ability of the binary classifier system varies related to the variation of the discrimination threshold.

17. An industrialized method for a system for rice grain recognition, the method comprising:
 capturing optical images, using an optical capturing device;
 transmitting the optical images to a digital platform over a data transmission network via a data interface;
 analyzing the optical images, using circuitry at the digital platform;
 providing a response to the rice grain recognition to the optical capturing device and/or a user device; and
 using a segmentation module implemented by the circuitry, automatically segmenting the captured and transmitted optical images for grains by identifying optical image segments capturing grains or grain parts,
 wherein, using a feature extractor implemented by the circuitry, measurable grain features are extracted from the identified grains or grain parts in the optical images, the features describing different parametrized aspects of the grains or grain parts by a feature extraction process at least comprising shape parameter values and color parameter values and/or spatial parameters and/or geometric parameters,
 wherein, in a learning mode of the circuitry, a plurality of machine learning structures are sequential selected by a selector of a classifier, the selector applying the machine learning structures to the extracted grain features for rice grain recognition, and selecting an applied machine learning structure of the applied machine learning structures, which has a number of grains or grain parts classified as false positive regarding quality as low as possible while keeping an accuracy as high as possible, and
 wherein the selected machine learning structure of the applied machine learning structures is further optimized by varying a discrimination threshold by a threshold trigger, wherein the classified false positives are further minimized to a determined threshold probability for a grain to be classified as good, so that a variation of the discrimination threshold varies a diagnostic ability of the system which is a binary classifier system related to the variation of the discrimination threshold.

* * * * *